(12) United States Patent
Schmutz et al.

(10) Patent No.: US 6,541,547 B1
(45) Date of Patent: *Apr. 1, 2003

(54) PROCESS FOR STABILIZATION OF POLYOLEFINS IN PERMANENT CONTACT WITH EXTRACTING MEDIA

(75) Inventors: Thomas Schmutz, Riehen (CH); Erich Kramer, Basel (CH); Hans Zweifel, Basel (CH); Bruno Rotzinger, Birsfelden (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1048 days.

(21) Appl. No.: 08/709,975

(22) Filed: Sep. 9, 1996

(51) Int. Cl.$^7$ .................... C08K 5/3432; C08K 5/526; C08K 5/13

(52) U.S. Cl. ................. 524/103; 524/99; 524/117; 524/119; 524/126; 524/127; 524/151; 524/153; 524/194; 524/350

(58) Field of Search .................. 524/100, 102, 524/101, 103, 151, 153, 126, 127, 117, 119, 194, 99

(56) References Cited

U.S. PATENT DOCUMENTS

| | | | | |
|---|---|---|---|---|
| 3,558,554 A | * | 1/1971 | Kuriyama et al. | 524/151 |
| 3,825,629 A | * | 7/1974 | Hofer et al. | 524/126 |
| 3,901,955 A | * | 8/1975 | Hofer | 524/126 |
| 4,263,230 A | * | 4/1981 | Uhino | 524/126 |
| 4,318,845 A | * | 3/1982 | Spivack et al. | 524/119 |
| 4,374,219 A | * | 2/1983 | Spivack et al. | 524/128 |
| 4,423,174 A | * | 12/1983 | Minagawa et al. | 524/128 |
| 4,474,914 A | * | 10/1984 | Spivack | 524/100 |
| 4,532,165 A | | 7/1985 | Hashimoto et al. | 428/36 |
| 4,806,580 A | * | 2/1989 | Buck et al. | 524/126 |
| 4,824,885 A | * | 4/1989 | Magni et al. | 524/121 |
| 4,829,110 A | * | 5/1989 | Ashbrook et al. | 524/102 |
| 4,829,112 A | * | 5/1989 | Ishii et al. | 524/126 |
| 4,863,981 A | * | 9/1989 | Gugumus | 524/100 |
| 4,985,479 A | | 1/1991 | Nagasaki et al. | 524/96 |
| 4,985,481 A | * | 1/1991 | Neri et al. | 524/120 |
| 4,999,393 A | * | 3/1991 | Haruna et al. | 524/126 |
| 5,015,679 A | * | 5/1991 | Matsumura | 524/100 |
| 5,021,485 A | * | 6/1991 | Gugumus | 524/100 |
| 5,055,507 A | * | 10/1991 | Haruna et al. | 524/117 |
| 5,162,406 A | | 11/1992 | Meyer et al. | 524/101 |
| 5,225,526 A | * | 7/1993 | Fukawa et al. | 524/126 |
| 5,238,979 A | * | 8/1993 | Haruna et al. | 524/101 |
| 5,300,257 A | * | 4/1994 | Akashi et al. | 524/151 |

FOREIGN PATENT DOCUMENTS

| | | |
|---|---|---|
| AU | 629804 | 12/1988 |
| CH | 4418080 | 12/1994 |
| EP | 0124664 | 11/1984 |
| EP | 0310393 | 4/1989 |
| EP | 0324106 | 7/1989 |
| EP | 343717 | * 11/1989 |
| EP | 0391438 | 10/1990 |
| EP | 0411628 | 2/1991 |
| EP | 0659750 | 6/1995 |
| GB | 2278362 | 11/1994 |
| GB | 2293827 | 4/1996 |
| WO | 94/07950 | 4/1994 |

OTHER PUBLICATIONS

R. Gächten et al. Plastics Additives Handbook 3rd. Ed. pp. 2–104 (1990).

* cited by examiner

*Primary Examiner*—Peter Szekely
(74) *Attorney, Agent, or Firm*—Luther A.R. Hall; Kevin T. Mansfield

(57) ABSTRACT

Polyolefin mouldings which have excellent stability on permanent contact with extracting media comprise, as stabilizers, a selected mixture comprising an organic phosphite or phosphonite and a specially selected group of sterically hindered phenols or a certain group of sterically hindered amines. In addition, a selected three-component mixture comprising a phosphite or phosphonite, a phenolic antioxidant and a certain group of sterically hindered amines is particularly suitable as stabilizer for polyolefin moldings which are in permanent contact with extracting media.

5 Claims, No Drawings

PROCESS FOR STABILIZATION OF POLYOLEFINS IN PERMANENT CONTACT WITH EXTRACTING MEDIA

The present invention relates to compositions comprising a polyolefin which is in permanent contact with extracting media, and stabilizer mixtures, to the use thereof for stabilizing thick-layer polyolefin mouldings, and to a process for stabilizing thick-layer polyolefin mouldings.

R. Gächter and H. Müller, "Plastics Additives Handbook, 3rd Edition", pages 1 to 100 (1990), discloses, for example, that polyolefins can be protected against oxidative damage during preparation, processing and use by means of suitable stabilizer mixtures. In many cases, the stabilized polyolefin mouldings are in contact with liquid or gaseous media during use. It is therefore necessary that the stabilizer mixtures added to the polyolefin moulding have adequate chemical resistance to the particular contact media. Examples of polyolefin mouldings which are particularly at risk are pipes, undersea cables, tanks and geo-membranes which are in permanent contact with extracting media.

EP-A-0 324 106 describes a polyolefin moulding composition which has particularly good stability in permanent contact with extracting media. The stabilizer mixture used is a symmetrical triaryl phosphite and an ester of 3,3-bis(3'-tert-butyl-4'-hydroxyphenyl)butanoic acid.

It has now been found that a selected mixture comprising an organic phosphite or phosphonite and a specially selected group of sterically hindered phenols or a certain group of sterically hindered amines are particularly suitable as stabilizers for polyolefin mouldings which are in permanent contact with extracting media. It has also been found that a three-component mixture comprising a phosphite or phosphonite, a phenolic antioxidant and a certain group of sterically hindered amines is particularly suitable as stabilizer for polyolefin mouldings which are in permanent contact with extracting media.

The present invention therefore relates to compositions comprising a) a polyolefin which is in permanent contact with extracting media,
b) at least one compound from the group consisting of organic phosphites or phosphonites,
c) (i) at least one compound of the formula I or II

(I)

(II)

in which
n is the number 1 or 3,
$R_1$ is $C_1$–$C_{18}$alkyl, $C_5$–$C_{12}$cycloalkyl, phenyl or $C_7$–$C_9$phenylalkyl,
$R_2$ is hydrogen, $C_1$–$C_{18}$alkyl, $C_5$–$C_{12}$cycloalkyl, phenyl or $C_7$–$C_9$phenylalkyl,
$R_3$ is hydrogen or methyl,
if n is 1,
$R_4$ is hydrogen, $C_1$–$C_4$alkyl or

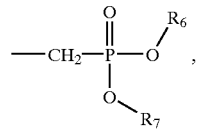

if n is 3, $R_4$ is

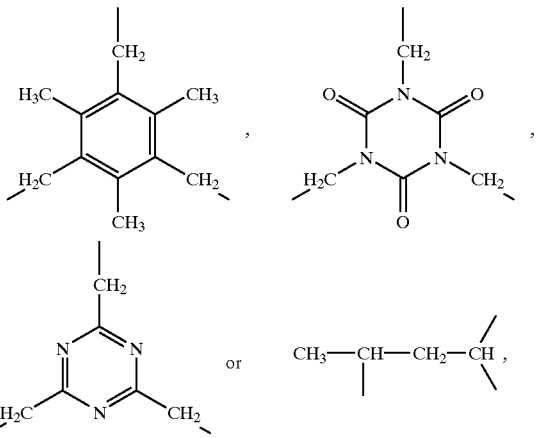

$R_5$ is hydrogen or methyl,
$R_6$ is hydrogen, $C_1$–$C_{20}$alkyl, unsubstituted or $C_1$–$C_4$alkyl-substituted phenyl or naphthyl; or $$\frac{M^{r+}}{r},$$

$R_7$ is $C_1$–$C_{20}$alkyl, unsubstituted or $C_1$–$C_4$alkyl-substituted phenyl or naphthyl,
$M^{r+}$ is an r-valent metal cation, and
r is 1, 2 or 3; or
(ii) at least one compound from the group consisting of sterically hindered amines having a molecular weight of greater than 500 and containing at least one radical of the formula III or IV

(III)

(IV)

in which

G is hydrogen or methyl,

G$_1$ and G$_2$ are hydrogen, methyl or together are =O; or (iii) (x) at least one compound from the group consisting of phenolic antioxidants, and (y) at least one compound from the group consisting of sterically hindered amines having a molecular weight of greater than 500 and containing at least one radical of the formula III or IV.

Alkyl having up to 20 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. R$_1$ and R$_2$ are preferably C$_1$–C$_{12}$alkyl, in particular C$_1$–C$_8$alkyl, for example tert-butyl. R$_7$ is particularly preferably C$_1$–C$_{12}$alkyl, in particular C$_1$–C$_{10}$alkyl, for example C$_1$–C$_8$alkyl.

C$_5$–C$_{12}$cycloalkyl, in particular C$_5$–C$_8$cycloalkyl, is, for example, cyclopentyl, cyclohexyl, cycloheptyl or cyclooctyl. Cyclohexyl is preferred.

C$_7$–C$_9$phenylalkyl is, for example, benzyl, α-methylbenzyl, α,α-dimethylbenzyl or 2-phenylethyl.

C$_1$–C$_4$alkyl-substituted phenyl or naphthyl, which preferably contains 1 to 3, in particular 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-di-methylphenyl, 2-methyl-6-ethylphenyl, 4-tert-butylphenyl, 2-ethylphenyl, 2,6-diethyl-phenyl, 1-methylnaphthyl, 2-methylnaphthyl, 4-methylnaphthyl, 1,6-dimethylnaphthyl or 4-tert-butylnaphthyl.

A monovalent, divalent or trivalent metal cation is preferably a cation of an alkali metal, alkaline earth metal, heavy metal or aluminium, for example Na$^+$, K$^+$, Mg$^{++}$, Ca$^{++}$, Ba$^{++}$, Zn$^{++}$ or Al$^{+++}$. Ca$^{++}$ is particularly preferred.

Of interest are compositions in which component (b) is an organic phosphite or phosphonite of the formula (1) to (7)

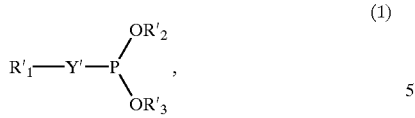
(1)

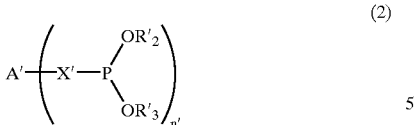
(2)

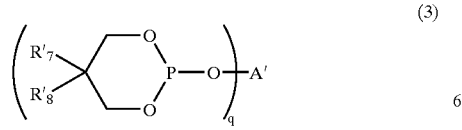
(3)

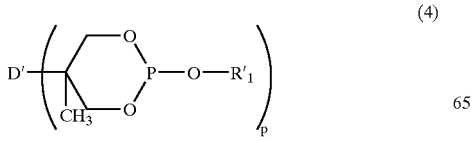
(4)

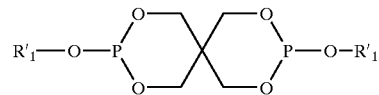
(5)

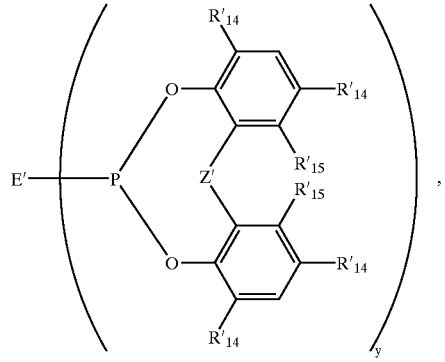
(6)

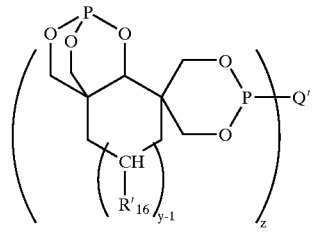
(7)

in which the indices are integers and n' is 2, 3 or 4; p is 1 or 2; q is 2 or 3; r is 4 to 12; y is 1, 2 or 3; and z is 1 to 6;

A', if n' is 2, is alkylene having 2 to 18 carbon atoms; alkylene having 2 to 12 carbon atoms which is interrupted by —S—, —O— or —NR'$_4$—; a radical of the formula

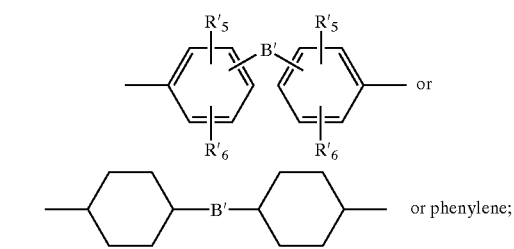

or phenylene;

A', if n' is 3, is a radical of the formula —C$_r$H$_{2r-1}$—;

A', if n' is 4, is the radical of the formula C(CH$_2$)$_4$;

A" is as defined for A' if n' is 2;

B' is a radical of the formula —CH$_2$—; —CHR'$_4$—; —CR'$_1$R'$_4$—; —S— or a direct bond; or C$_5$–C$_7$cycloalkylidene; or cyclohexylidene which is substituted by 1 to 4 C$_1$–C$_4$alkyl radicals in position 3, 4 and/or 5;

D', if p is 1, is methyl and, if p is 2, is —CH$_2$OCH$_2$—;

E', if y is 1, is alkyl having 1 to 18 carbon atoms, a radical of the formula —OR'$_1$ or halogen;

E', if y is 2, is a radical of the formula —O—A"—O—;

E', if y is 3, is a radical of the formula $R'_4C(CH_2O)_{\overline{3}}$;

Q' is the radical of an at least z-valent alcohol or phenol, this radical being bonded to the P atom(s) via the alcoholic or phenolic O atom(s);

$R'_1$, $R'_2$ and $R'_3$, independently of one another, are alkyl having 1 to 30 carbon atoms; alkyl having 1 to 18 carbon atoms which is substituted by halogen, —$COOR'_4$, —CN or —$CONR'_4R'_4$; alkyl having 2 to 18 carbon atoms which is interrupted by —S—, —O— or —$NR'_4$—; phenyl-$C_1$–$C_4$—alkyl; cycloalkyl having 5 to 12 carbon atoms; phenyl or naphthyl; phenyl or naphthyl which is substituted by halogen, 1 to 3 alkyl radicals or alkoxy radicals having a total of 1 to 18 carbon atoms or phenyl-$C_1$–$C_4$alkyl; or a radical of the formula

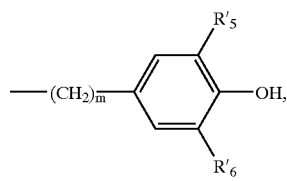

in which m is an integer in the range from 3 to 6;

each $R'_4$, independently of the others, is hydrogen; alkyl having 1 to 18 carbon atoms, cycloalkyl having 5 to 12 carbon atoms; or phenylalkyl having 1 to 4 carbon atoms in the alkyl moiety;

$R'_5$ and $R'_6$, independently of one another, are hydrogen; alkyl having 1 to 8 carbon atoms or cycloalkyl having 5 or 6 carbon atoms;

$R'_7$ and $R'_8$, in the case where q=2, are, independently of one another, $C_1$–$C_4$alkyl or together are a 2,3-dehydropentamethylene radical; and $R'_7$ and $R'_8$, in the case where q=3, are methyl;

the substituents $R'_{14}$, independently of one another, are hydrogen; alkyl having 1 to 9 carbon atoms or cyclohexyl;

the substituents $R'_{15}$, independently of one another, are hydrogen or methyl; and $R'_{16}$ is hydrogen or $C_1$–$C_4$alkyl, and in the case where a plurality of radicals $R'_{16}$ are present, the radicals $R'_{16}$ are identical or different;

X' and Y' are each a direct bond or —O—; and

Z' is a direct bond; —$CH_2$—; —$C(R'_{16})_2$— or —S—.

Of particular interest are compositions comprising as component (b) a phosphite or phosphonite of the formula (1), (2), (5) or (6) in which n' is the number 2 and y is the number 1 or 2;

A' is alkylene having 2 to 18 carbon atoms; p-phenylene or p-biphenylene;

E', in the case where y=1, is $C_1$–$C_{18}$alkyl, —$OR_1$ or fluorine; and in the case where y=2, is p-biphenylene;

$R'_1$, $R'_2$ and $R'_3$, independently of one another, are alkyl having 1 to 18 carbon atoms; phenyl-$C_1$–$C_4$alkyl; cyclohexyl; phenyl; or phenyl which is substituted by 1 to 3 alkyl radicals having a total of 1 to 18 carbon atoms;

the substituents $R'_{14}$ independently of one another, are hydrogen or alkyl having 1 to 9 carbon atoms;

$R'_{15}$ is hydrogen or methyl;

X' is a direct bond;

Y' is —O—; and

Z' is a direct bond or —$CH(R'_{16})$—.

Also of interest are compositions comprising as component (b) a phosphite or phosphonite of the formula (1), (2), (5) or (6) in which n' is the number 2 and y is the number 1;

A' is p-biphenylene;

E' is $C_1$–$C_{18}$alkoxy or fluorine;

$R'_1$, $R'_2$ and $R'_3$, independently of one another, are alkyl having 1 to 18 carbon atoms; or phenyl which is substituted by 2 or 3 alkyl radicals having a total of 2 to 12 carbon atoms;

the substituents $R'_{14}$, independently of one another, are methyl or tert-butyl;

$R'_{15}$ is hydrogen;

X' is a direct bond;

Y' is —O—; and

Z' is a direct bond, —$CH_2$— or —$CH(CH_3)$—.

Particular preference is given to compositions comprising as component (b) a phosphite, in particular of the formula (1) or (5).

The following compounds are examples of phosphites or phosphonites which are particularly suitable as component (b) in the novel composition:

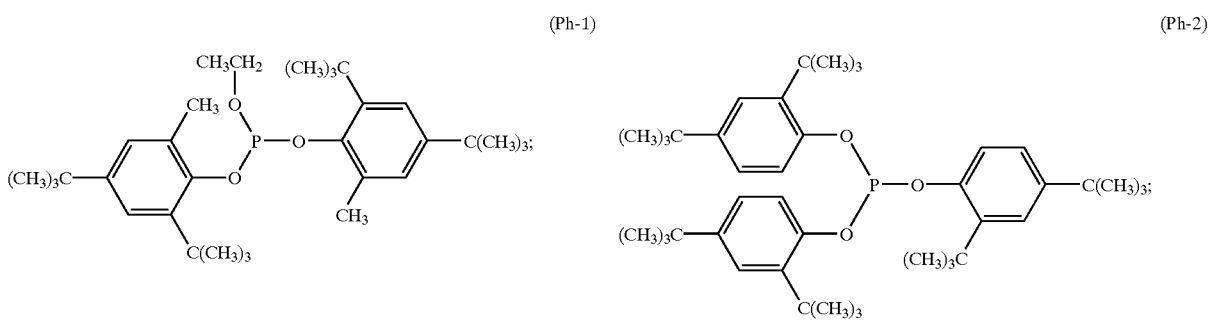

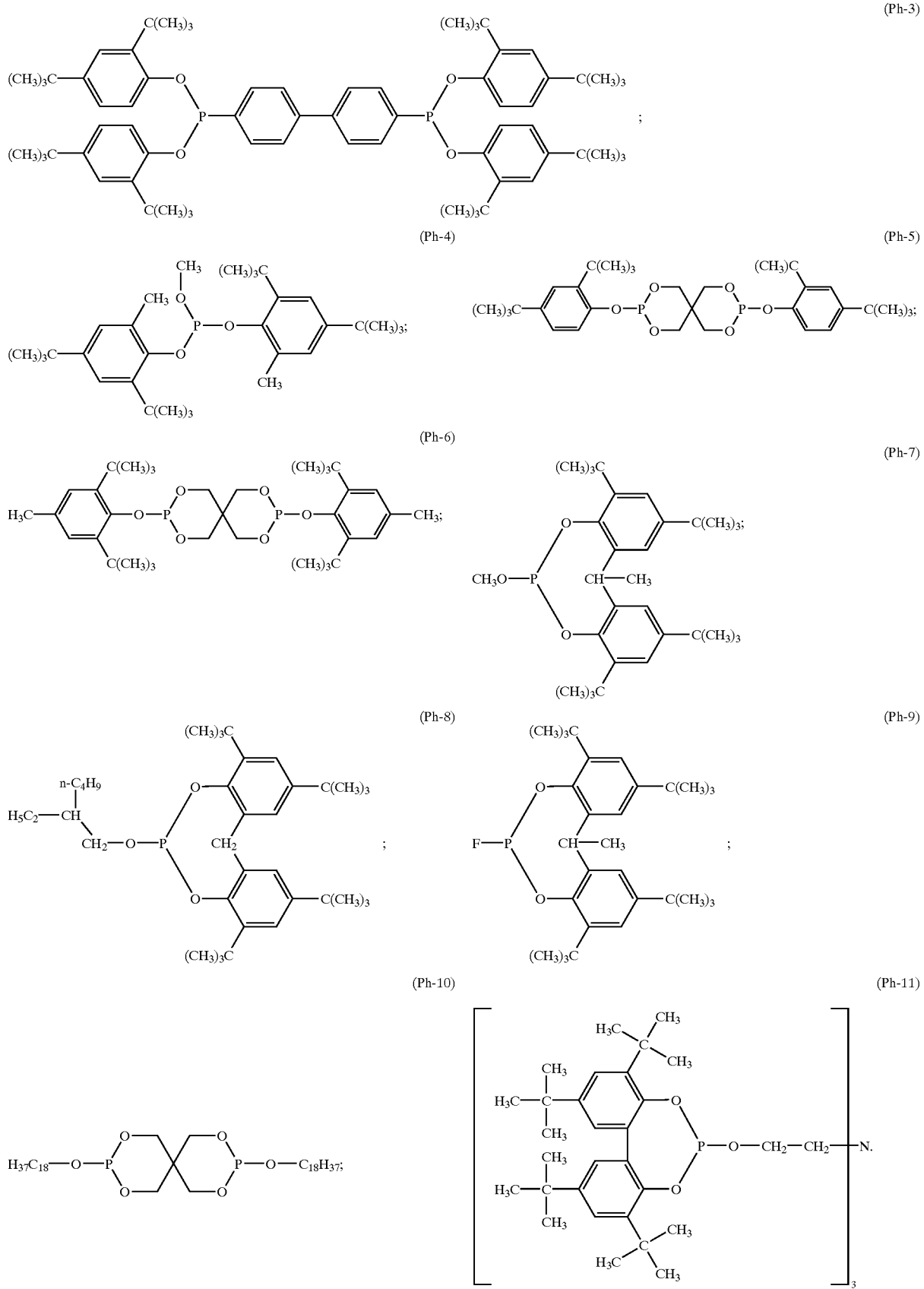

These phosphites and phosphonites are known compounds, and some are commercially available.

Particular preference is given to compositions comprising as component (b) a compound of the formula V, Ph-1, Ph-3 or Ph-11

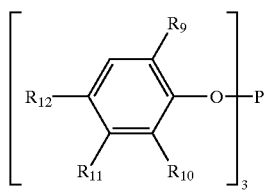
(V)

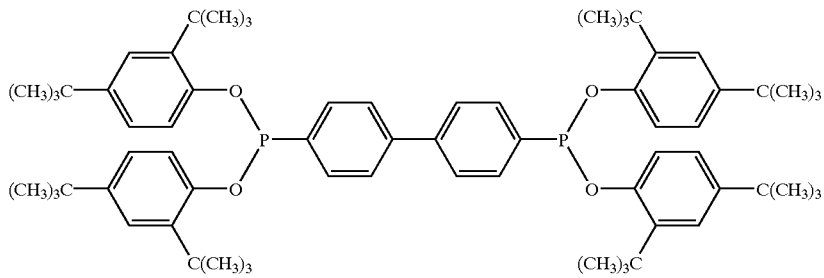
(Ph-3)

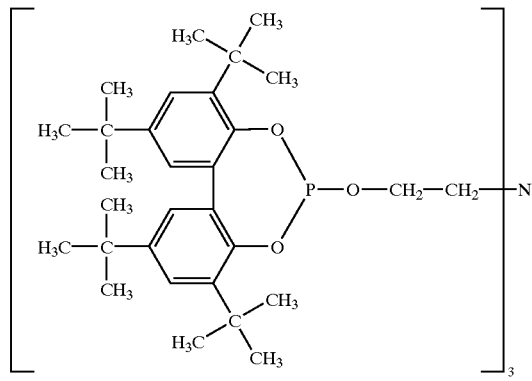
(Ph-11)

in which

R$_9$ and R$_{12}$, independently of one another, are hydrogen, C$_1$–C$_8$alkyl, cyclohexyl or phenyl, and R$_{10}$ and R$_{11}$, independently of one another, are hydrogen or C$_1$–C$_4$alkyl.

Of interest are compositions comprising as component (c)(i) a compound of the formula I or II in which n is the number 1 or 3,
R$_1$ is C$_1$–C$_{12}$alkyl, C$_5$–C$_8$cycloalkyl, phenyl or benzyl,
R$_2$ is hydrogen, C$_1$–C$_{12}$alkyl, C$_5$–C$_8$cycloalkyl, phenyl or benzyl, R$_3$ is hydrogen or methyl, if n is 1, R$_4$ is 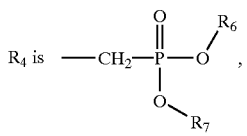,

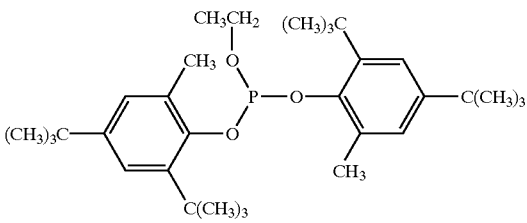
(Ph-1)

if n is 3,

R$_4$ is 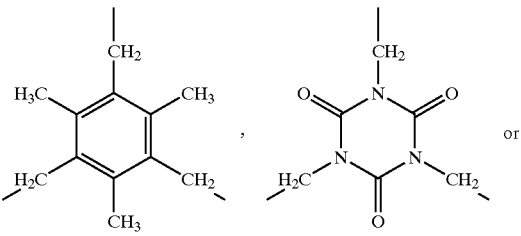

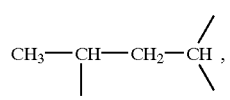

R$_5$ is hydrogen or methyl, $R_6$ is hydrogen, $C_1$–$C_{12}$alkyl or $$\frac{M^{r+}}{r},$$

$R_7$ is $C_1$–$C_{12}$alkyl, $M^{r+}$ is an r-valent metal cation, and r is 1, 2 or 3.

Preference is given to compositions comprising as component (c)(i) a compound of the formula I in which n is the number 1 or 3, $R_1$ is tert-butyl, cyclohexyl or phenyl, $R_2$ is hydrogen, tert-butyl, cyclohexyl or phenyl, $R_3$ is hydrogen, if n is 1,

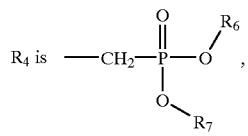

if n is 3,

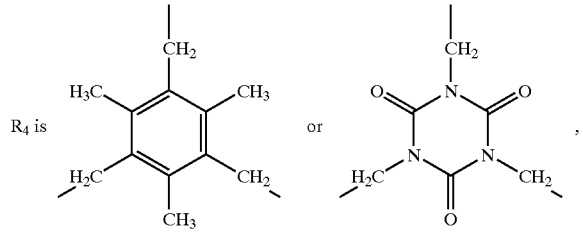

$R_6$ is $C_1$–$C_4$alkyl or $$\frac{M^{r+}}{r},$$

$R_7$ is $C_1$–$C_{12}$alkyl, $M^{r+}$ is calcium, and r is 2.

Very particular preference is given to compositions comprising as component (c)(i) a compound of the formula

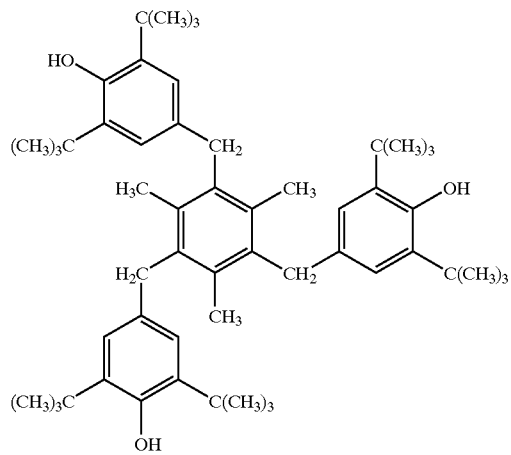

Irganox® 1330 (Ciba-Geigy)

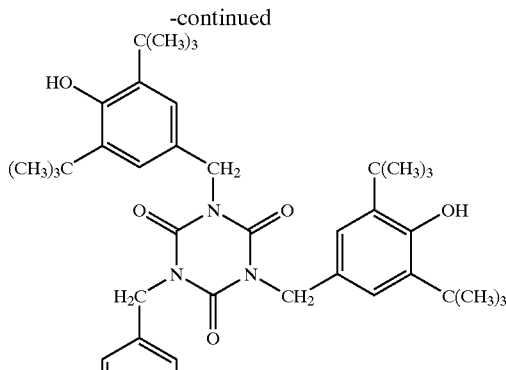

Irganox® 3114 (Ciba-Geigy)

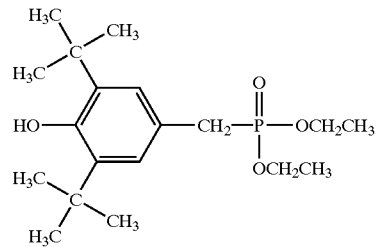

Irganox® 1222 (Ciba-Geigy)

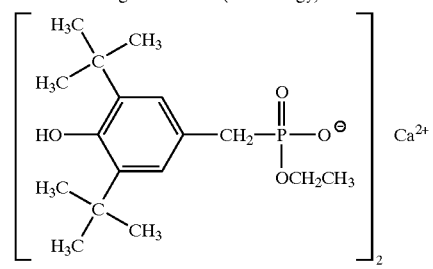

Irganox® 1425 (Ciba-Geigy)

Of particular interest are compositions comprising as component (c)(ii) or component (c)(iii)(y) a sterically hindered amine from the class of compounds described under (a') to (g') which contain at least one radical of the formula III or IV.

(a') Compounds of the formula IV'

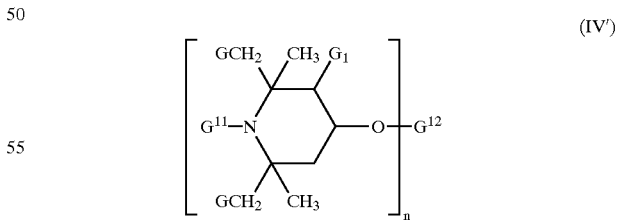

in which n is a number from 1 to 4, G and $G^1$ independently of one another, are hydrogen or methyl, $G^{11}$ is hydrogen, oxygen, hydroxyl, $C_1$–$C_{18}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, benzyloxy, glycidyl or a group of the formula —CH$_2$CH(OH)—Z, in which Z is hydrogen, methyl or phenyl, G$^{11}$ preferably being H, C$_1$–C$_4$alkyl, allyl, benzyl, acetyl or acryloyl, and G$^{12}$, if n is 1, is hydrogen, C$_1$–C$_{18}$alkyl which is uninterrupted or interrupted by one or more oxygen atoms, cyanoethyl, benzoyl, glycidyl, a monovalent radical or an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COOZ$^{12}$ groups, in which Z$^{12}$ is H, C$_{1-C20}$alkyl, C$_3$–C$_{12}$alkenyl, C$_5$–C$_7$cycloalkyl, phenyl or benzyl, G$^{12}$, if n is 2, is C$_2$–C$_{12}$alkylene, C$_4$–C$_{12}$alkenylene, xylylene, a divalent radical or an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two —COOZ$^{12}$ groups, G$^{12}$, if n is 3, is a trivalent radical of an aliphatic, cycloaliphatic or aromatic tricarboxylic acid, which may be substituted in the aliphatic, cycloaliphatic or aromatic moiety by —COOZ$^{12}$, of an aromatic tricarbamic acid or of a phosphorus-containing acid, or is a trivalent silyl radical, and G$^{12}$, if n is 4, is a tetravalent radical of an aliphatic, cycloaliphatic or aromatic tetracarboxylic acid. The carboxylic acid radicals mentioned above are in each case taken to mean radicals of the formula (—CO)$_n$R, where n is as defined above, and the meaning of R arises from the definition given.

Any C$_1$–C$_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

C$_1$–C$_{18}$alkyl G$^{11}$ or G$^{12}$ can be, for example, the above-mentioned groups and in addition, for example, n-tridecyl, n-tetradecyl, n-hexadecyl or n-octadecyl.

C$_3$–C$_8$alkenyl G$^{11}$ can be, for example, 1-propenyl, allyl, methallyl, 2-butenyl, 2-pentenyl, 2-hexenyl, 2-octenyl, or 4-tert-butyl-2-butenyl.

C$_3$–C$_8$alkynyl G$^{11}$ is preferably propargyl.

C$_7$–C$_{12}$aralkyl G$^{11}$ is, in particular, phenethyl, especially benzyl.

C$_1$–C$_8$alkanoyl G$^{11}$ is, for example, formyl, propionyl, butyryl, octanoyl, but preferably acetyl and C$_3$–C$_5$alkenoyl G$^{11}$ is in particular acryloyl.

If G$^{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If G$^{12}$ is a monovalent silyl radical, it is, for example, a radical of the formula —(C$_j$H$_{2j}$)—Si(Z')$_2$Z'', in which j is an integer in the range from 2 to 5, and Z' and Z'', independently of one another, are C$_1$–C$_4$alkyl or C$_1$–C$_4$alkoxy.

If G$^{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical.

If G$^{12}$ is a trivalent radical of a tricarboxylic acid, it is, for example, a trimellitoyl, citryl or nitrilotriacetyl radical.

If G$^{12}$ is a tetravalent radical of a tetracarboxylic acid, it is, for example, the tetravalent radical of butane-1,2,3,4-tetracarboxylic acid or of pyromellitic acid.

If G$^{12}$ is a divalent radical of a dicarbamic acid, it is, for example, hexamethylenedicarbamoyl or 2,4-toluylenedicarbamoyl radical.

Preference is given to compounds of the formula IV' in which G is hydrogen, G$^{11}$ is hydrogen or methyl, n is 2 and G$^{12}$ is the diacyl radical of an aliphatic dicarboxylic acid having 4–12 carbon atoms.

Examples of polyalkylpiperidine compounds from this class are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-ylβ-(3,5-di-tert-butyl-4-hydroxyphenyl)propionate
9) di(1-benzyl-2,2,6,6-tetramethylpiperidin-4-yl)maleate
10) di(2,2,6,6-tetramethylpiperidin-4-yl)succinate
11) di(2,2,6,6-tetramethylpiperidin-4-yl)glutarate
12) di(2,2,6,6-tetramethylpiperidin-4-yl)adipate
13) di(2,2,6,6-tetramethylpiperidin-4-yl)sebacate
14) di(1,2,2,6,6-pentamethylpiperidin-4-yl)sebacate
15) di(1,2,3,6-tetramethyl-2,6-diethyl-piperidin-4-yl)sebacate
16) di(1-allyl-2,2,6,6-tetramethylpiperidin-4-yl)phthalate
17) 1-hydroxy-4-β-cyanoethoxy-2,2,6,6-tetramethylpiperidine
18) 1-acetyl-2,2,6,6-tetramethylpiperidin-4-yl acetate
19) tri(2,2,6,6-tetramethylpiperidin-4-yl)trimellitate
20) 1-acryloyl$^4$-benzyloxy-2,2,6,6-tetramethylpiperidine
21) di(2,2,6,6-tetramethylpiperidin-4-yl)diethylmalonate
22) di(1,2,2,6,6-pentamethylpiperidin-4-yl)dibutylmalonate
23) di(1,2,2,6,6-pentamethylpiperidin-4-yl)butyl(3,5-di-tert-butyl-4-hydroxybenzyl)malonate
24) di(1-octyloxy-2,2,6,6-tetramethylpiperidin-4-yl)sebacate
25) di(1-cyclohexyloxy-2,2,6,6-tetramethylpiperidin-4-yl)sebacate
26) hexane-1',6'-bis(4-carbamoyloxy-1-n-butyl-2,2,6,6-tetramethylpiperidine)
27) toluene-2',4'-bis-(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl)phosphite
31) tris(1-propyl-2,2,6,6-tetramethylpiperidin-4-yl)phosphate
32) phenyl bis(1,2,2,6,6-pentamethylpiperidin-4-yl)phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine (b') Compounds of the formula V'

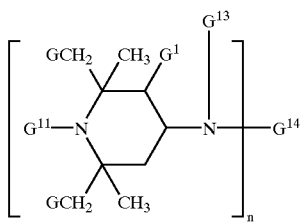

(V')

in which
n is the number 1 or 2, G, $G^1$ and $G^{11}$ are as defined under (a'),
$G^{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

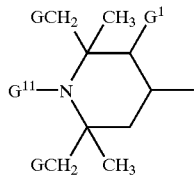

and
$G^{14}$, if n is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, glycidyl, a group of the formula —$CH_2$—CH(OH)—Z or of the formula —CONH—Z, in which Z is hydrogen, methyl or phenyl;
$G^{14}$, if n is 2, is $C_2$–$C_{12}$alkylene, $C_6$–$C_{12}$arylene, xylylene, a —$CH_2$—CH(OH)—$CH_2$ group or a —$CH_2$—CH(OH)—$CH_2$—O—D—O— group, in which D is $C_2$–$C_{10}$alkylene, $C_6$–$C_{15}$arylene, $C_6$–$C_{12}$cycloalkylene, or, provided that $G^{13}$ is not alkanoyl, alkenoyl or benzoyl, $G^{14}$ can alternatively be 1-oxo-$C_2$–$C_{12}$alkylene, a divalent radical of an aliphatic, cycloaliphatic or aromatic dicarboxylic acid or dicarbamic acid or alternatively the group —CO—, or,
if n is 1, $G^{13}$ and $G^{14}$ together can be the divalent radical of an aliphatic, cycloaliphatic or aromatic 1,2- or 1,3-dicarboxylic acid.

Any $C_1$–$C_{12}$- or $C_1$–$C_{18}$alkyl substituents are as defined above for (a').

Any $C_5$–$C_7$cycloalkyl substituents are, in particular, cyclohexyl.

$C_7$–$C_8$aralkyl $G^{13}$ is, in particular, phenylethyl or especially benzyl. $C_2$–$C_5$Hydroxyalkyl $G^{13}$ is, in particular, 2-hydroxyethyl or 2-hydroxypropyl.

$C_2$–$C_{18}$alkanoyl $G^{13}$ is, for example, propionyl, butyryl, octanoyl, dodecanoyl, hexadecanoyl, octadecanoyl, but preferably acetyl, and $C_3$–$C_5$alkenoyl $G^{13}$ is, in particular, acryloyl.

$C_2$–$C_8$alkenyl $G^{14}$ is, for example, allyl, methallyl, 2-butenyl, 2-pentenyl, 2-hexenyl or 2-octenyl.

$G^{14}$ as a hydroxyl-, cyano-, alkoxycarbonyl- or carbamide-substituted $C_1$–$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substitutes are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene is, in particular cyclohexylene.

Preference is given to compounds of the formula V' in which n is 1 or 2, G is hydrogen, $G^{11}$ is hydrogen or methyl, $G^{13}$ is hydrogen, $C_1$–$C_{12}$alkyl or a group of the formula

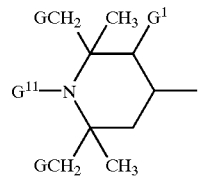

and $G^{14}$, in the case where n=1, is hydrogen or $C_1$–$C_{12}$alkyl, and, in the case where n=2, is $C_2$–$C_8$alkylene or 1-oxo-$C_2$–$C_8$alkylene.

Examples of polyalkylpiperidine compounds from this class are the following compounds:

37) N,N'-bis(2,2,6,6-tetramethylpiperidin-4-yl) hexamethylene-1,6-diamine
38) N,N'-bis(2,2,6,6-tetramethylpiperidin-4-yl) hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succinamide
45) di(2,2,6,6-tetramethylpiperidin-4-yl) N-(2,2,6,6-tetramethylpiperidin-4-yl)-β-aminodipropionate
46) The compound of the formula

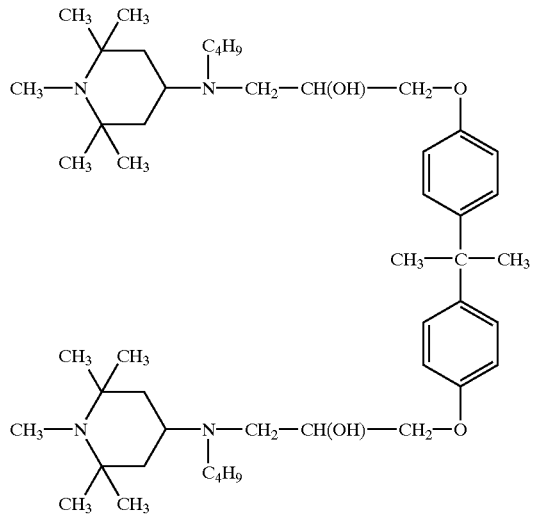

47) 4-(bis-2-hydroxyethylamino)-1,2,2,6,6-pentamethylpiperidine
48) 4-(3-methyl-4-hydroxy-5-tert-butyl-benzamido)-2,2,6, 6-tetramethylpiperdine
49) 4-methacrylamido-1,2,2,6,6-pentamethylpiperidine (c') Compounds of the formula VI'

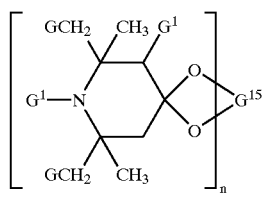

in which n is the number 1 or 2, G, $G^1$ and $G^{11}$ are as defined under (a), and $G^{15}$, if n is 1, is $C_2$–$C_8$alkylene, or $C_2$–$C_8$hydroxyalkylene or $C_4$–$C_{22}$acyloxyalkylene, and if n is 2, $G^{15}$ is the (—$CH_2$)$_2$C($CH_2$—)$_2$ group.

$C_2$–$C_8$alkylene or $C_2$–$C_8$hydroxyalkylene $G^{15}$ is, for example, ethylene, 1-methylethylene, propylene, 2-ethylpropylene or 2-ethyl-2-hydroxymethylpropylene.

$C_4$–$C_{22}$acyloxyalkylene $G^{15}$ is, for example, 2ethyl-2-acetoxymethylpropylene.

Examples of polyalkylpiperidine compounds from this class are the following compounds:
50) 9-aza-8,8,10,10-tetramethyl-1,5-dioxaspiro[5.5]undecane
51) 9-aza-8,8,10,10-tetramethyl-3ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]undecane
55) 2,2,6,6-tetramethylpiperidine-4-spiro-2'-(1',3'-dioxane)-5'-spiro-5"-(1",3"-dioxane)-2"-spiro-4'''-(2''',2''',6''',6'''-tetramethylpiperidine);

(d') Compounds of the formulae VIIA, VIIB and VIIC, preference being given to compounds of the formula VIIC,

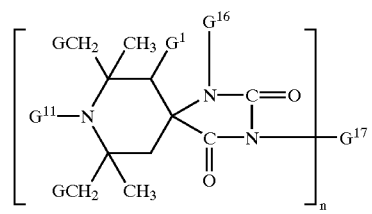

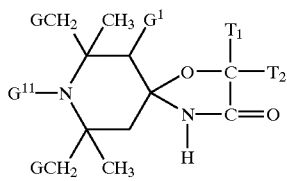

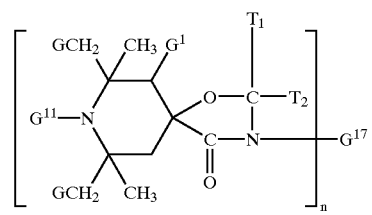

in which
n is the number 1 or 2, G, $G^1$ and $G^{11}$ are as defined under (a'),
$G^{16}$ is hydrogen, $C_1$–$C_{12}$alkyl, allyl, benzyl, glycidyl or $C_2$–$C_6$alkoxyalkyl, and $G^{17}$, if n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkcoxyalkyl, $C_6$–$C_{10}$aryl, glycidyl or a group of the formula —($CH_2$)$_p$—COO—Q or of the formula —($CH_2$)$_p$—O—CO—Q, in which p is 1 or 2, and Q is $C_1$–$C_4$alkyl or phenyl, and $G^{17}$, if n is 2, is $C_2$–$C_{12}$alkylene, $C_4$–$C_{12}$alkenylene, $C_6$–$C_{12}$arylene, a group of the formula —$CH_2$—CH(OH)—$CH_2$—O—D—O—$CH_2$—CH(OH)—$CH_2$—, in which D is $C_2$–$C_{10}$alkylene, $C_6$–$C_{15}$arylene, $C_6$–$C_{12}$cycloalkylene or a group of the formula —$CH_2$CH(OZ')$CH_2$—(O$CH_2$—CH(OZ')$CH_2$)$_2$—, in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$ together with the carbon atom bonding them form a $C_5$–$C_{14}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can be, for example, the abovementioned groups and in addition, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $G^{17}$ is, for example, 1-propenyl, allyl, methallyl, 2-butenyl or 2-pentenyl.

$C_7$–$C_9$aralkyl $G^{17}$, $T_1$ and $T_2$ are, in particular, phenethyl or especially benzyl. If $T_1$ and $T_2$ together with the carbon atom form a cycloalkane ring, this can be, for example, a cyclopentane, cyclohexane, cyclooctane or cyclododecane ring.

$C_2$–$C_4$hydroxyalkyl $G^{17}$ is, for example, 2-hydroxyethyl, 2-hydroxypropyl, 2-hydroxybutyl or 4-hydroxybutyl.

$C_6$–$C_{10}$aryl $G^{17}$, $T_1$ and $T_2$ are, in particular, phenyl or α- or β-naphthyl, which are unsubstituted or substituted by halogen or $C_1$–$C_4$alkyl.

$C_2$–$C_{12}$alkylene $G^{17}$ is, for example, ethylene, propylene, 2,2-dimethylpropylene, tetramethylene, hexamethylene, octamethylene, decamethylene or dodecamethylene.

$C_4$–$C_{12}$alkenylene $G^{17}$ is, in particular, 2-butenylene, 2-pentenylene or 3-hexenylene.

$C_6$–$C_{12}$arylene $G^{17}$ is, for example, o-, m- or p-phenylene, 1,4-naphthylene or 4,4'-diphenylene.

$C_2$–$C_{12}$alkanoyl Z' is, for example, propionyl, butyryl, octanoyl, dodecanoyl, but preferably acetyl.

$C_2$–$C_{10}$alkylene, $C_6$–$C_{15}$arylene or $C_6$–$C_{12}$cycloalkylene D is as defined under (b').

Examples of polyalkylpiperidine compounds from this class are the following compounds:
56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione
and the compounds of the following formulae:

66)
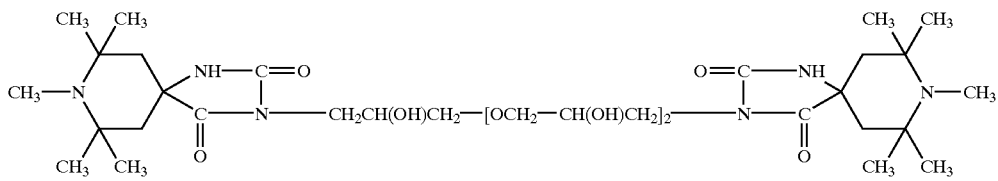

67)
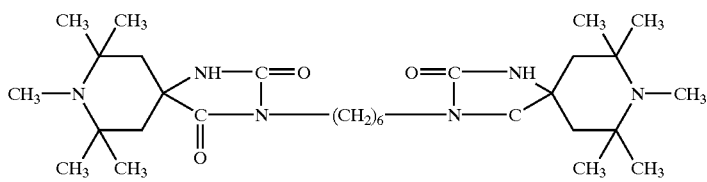

68)
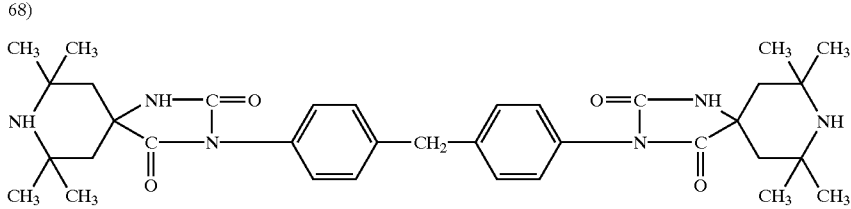

69)
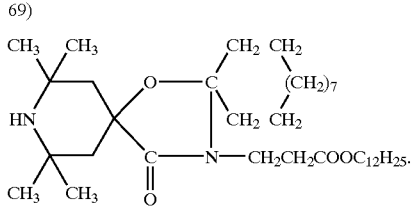

(e') Compounds of the formula VIII', which are themselves preferred,

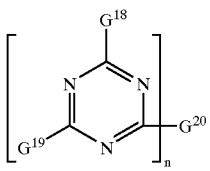
(VIII')

in which n is the number 1 or 2, and $G^{18}$ is a group of the formula

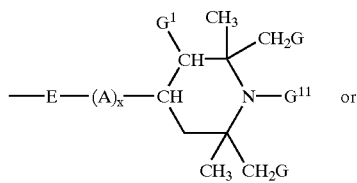 or

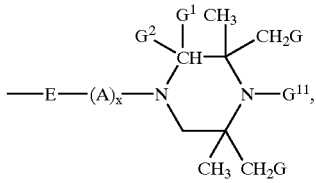

in which
G and $G^{11}$ are as defined under (a'), and $G^1$ and $G^2$ are hydrogen, methyl or, together, are a substituent =O,
E is —O— or —$NG^{13}$—, A is $C_2$-$C_6$alkylene or —$(CH_2)_3$—O— and x is the number 0 or 1,
$G^{13}$ is hydrogen, $C_1$-$C_{12}$alkyl, $C_2$-$C_5$hydroxyalkyl or $C_5$-$C_7$cycloalkyl,
$G^{19}$ is identical to $G^{18}$ or is one of the groups —$NG^{21}G^{22}$, —$OG^{23}$, —$NHCH_2OG^{23}$ or —$N(CH_2OG^{23})_2$,
$G^{20}$, if n=1, is identical to $G^{18}$ or $G^{19}$ and, if n=2, is an —E—B—E— group, in which B is $C_2$-$C_8$alkylene or $C_2$-$C_8$alkylene which is interrupted by 1 or 2 —$N(G^{21})$— groups,
$G^{21}$ is $C_1$-$C_{12}$alkyl, cyclohexyl, benzyl or $C_1$-$C_4$-hydroxyalkyl or a group of the formula

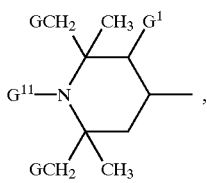

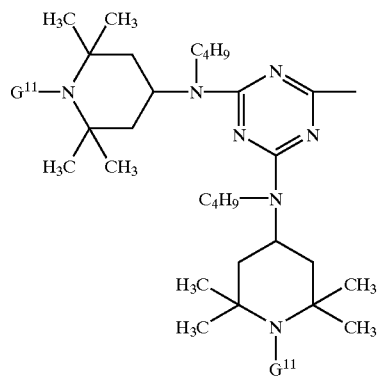

$G^{22}$ is $C_1$–$C_{12}$alkyl, cyclohexyl, benzyl or $C_1$–$C_4$hydroxyalkyl, and $G^{23}$ is hydrogen, $C_1$–$C_{12}$alkyl or phenyl, or $G^{21}$ and $G^{22}$ together are $C_4$–$C_5$alkylene or $C_4$–$C_5$oxaalkylene, for example

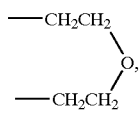

or a group of the formula

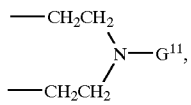

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents are, for example, 2-hydroxyethyl, 2-hydroxypropyl, 3-hydroxypropyl, 2-hydroxybutyl or 4-hydroxybutyl.

$C_2$–$C_6$alkylene A is, for example, ethylene, propylene, 2,2-dimethylpropylene, tetramethylene or hexamethylene.

If $G^{21}$ and $G^{22}$ together are $C_4$–$C_5$alkylene or oxaalkylene, they are, for example, tetramethylene, pentamethylene or 3-oxapentamethylene.

Examples of polyalkylpiperidine compounds from this class are the compounds of the following formulae:

70)

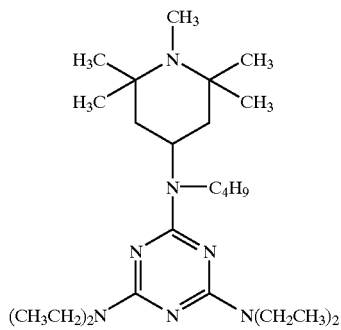

71)

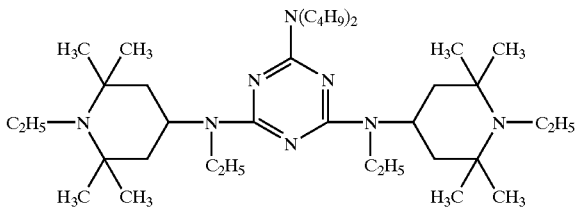

72)

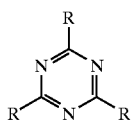

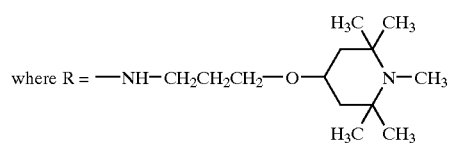

73)

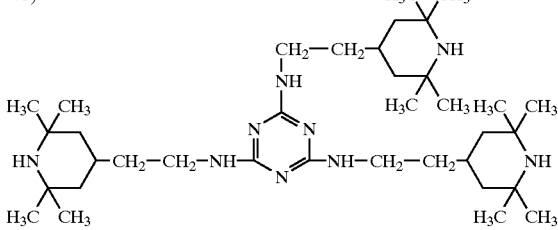

74)
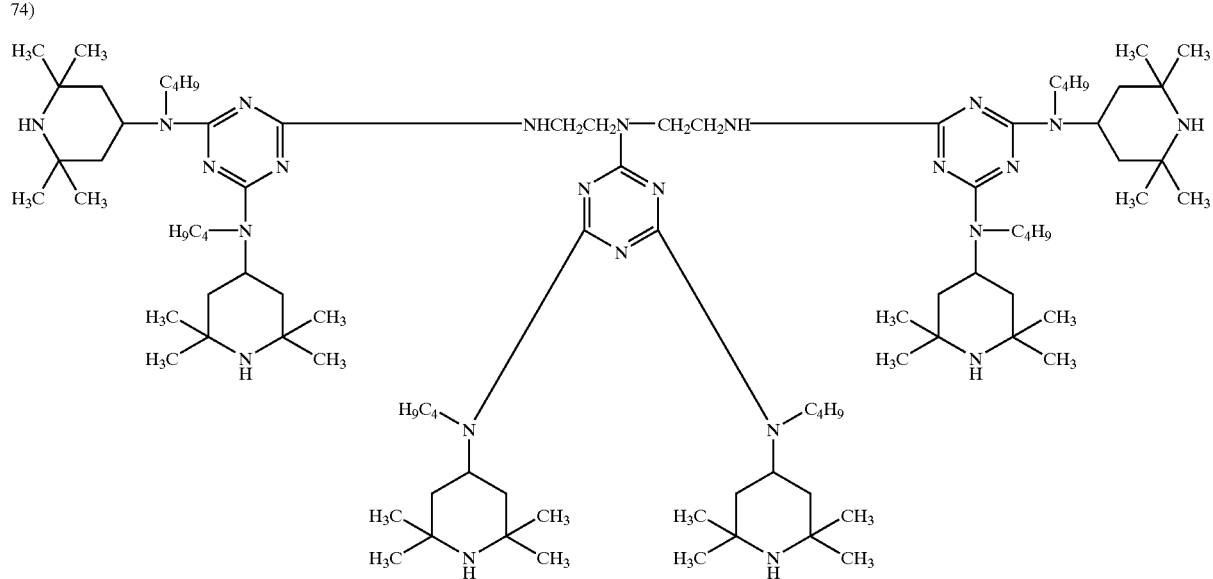
75)
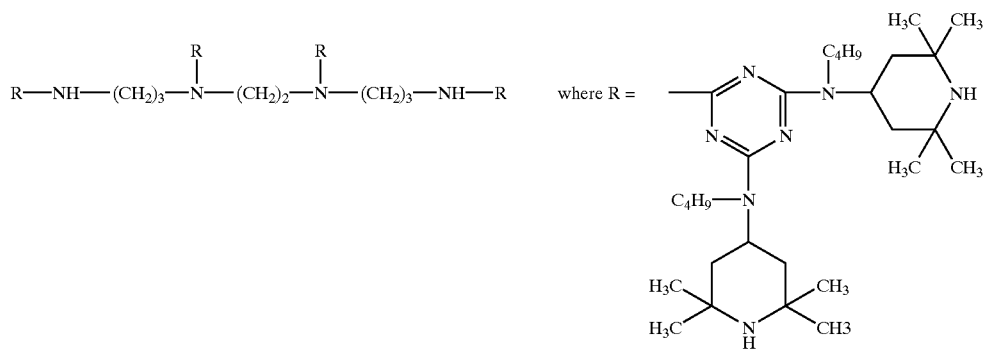
76)
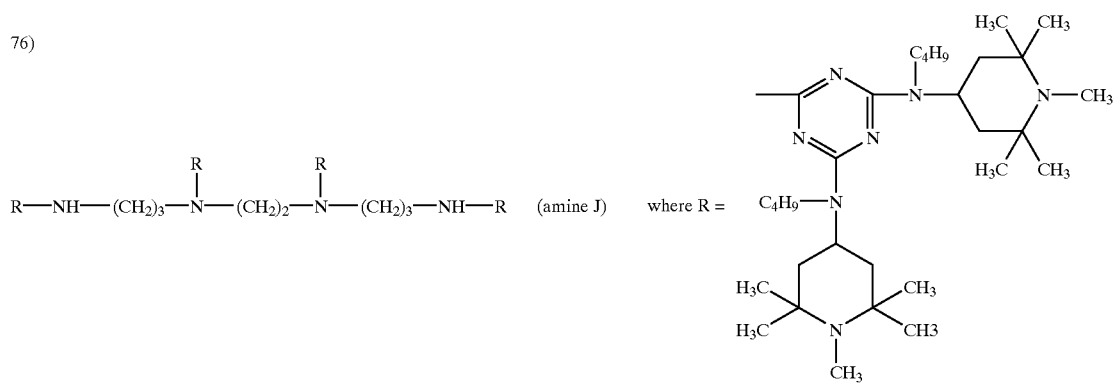

77)

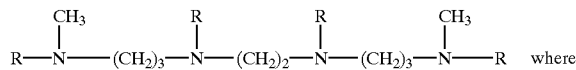 where R = 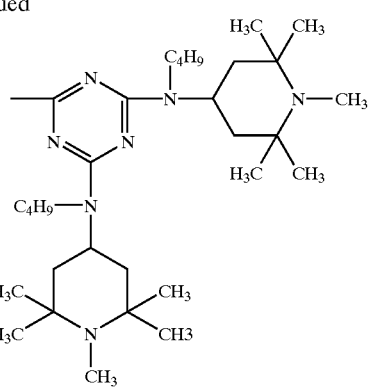

78)

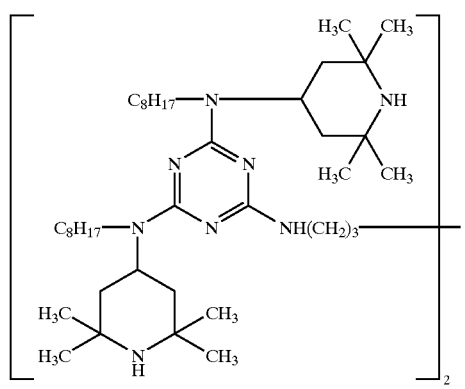

79)

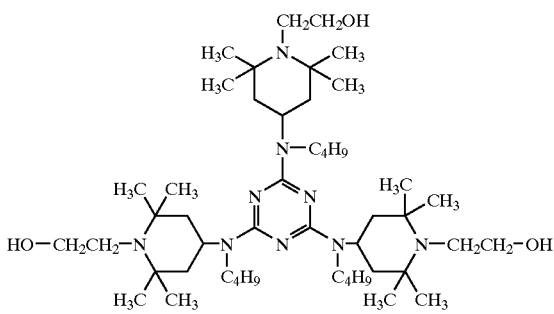

80)

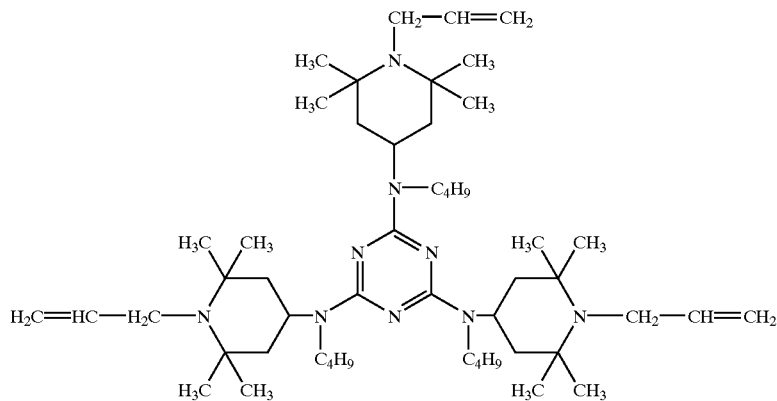

(f) Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae, where m is a number from 2 to about 200:

81) 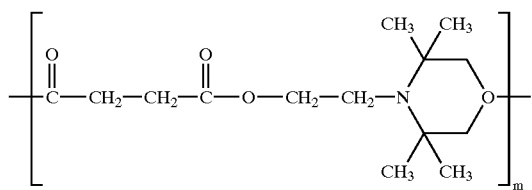
82) 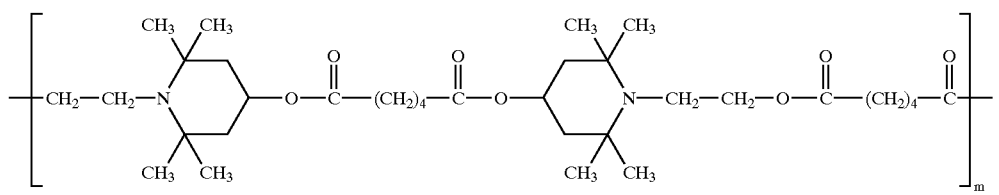
83) 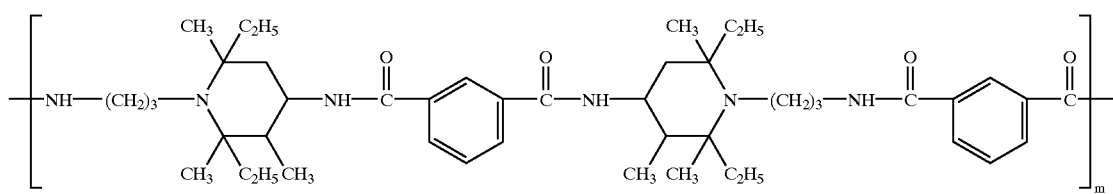
84) 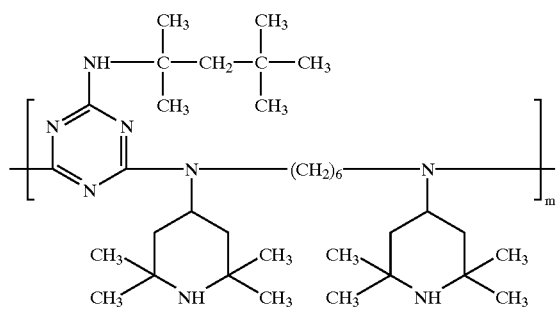
85) 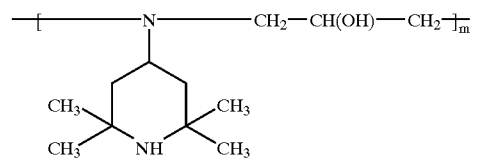
86) 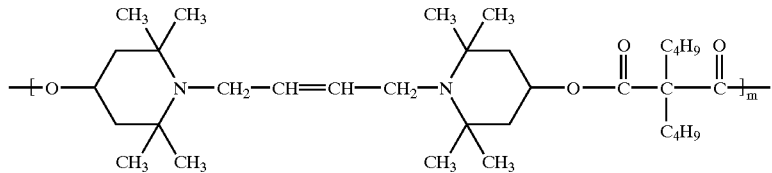
87) 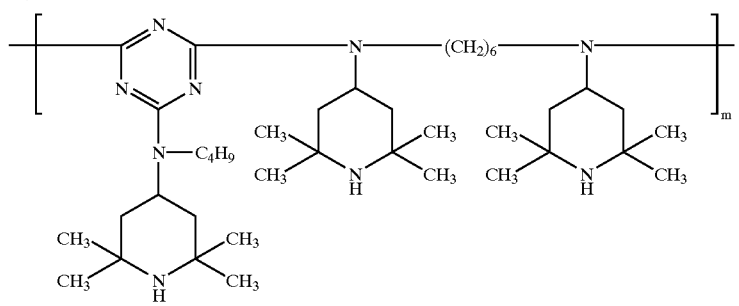

-continued
88) 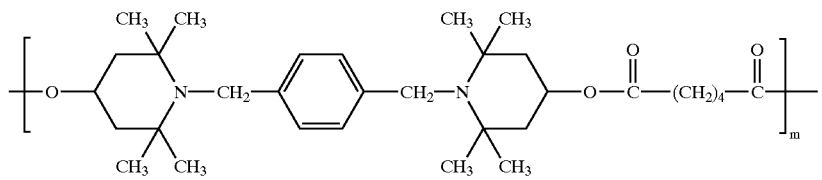
89) 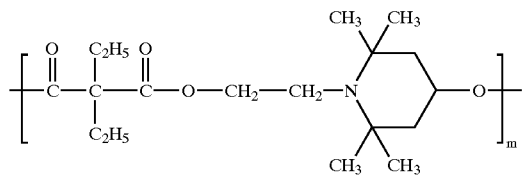
90) 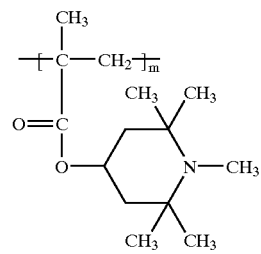
91) 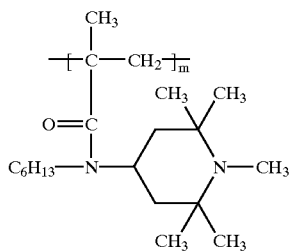
92) 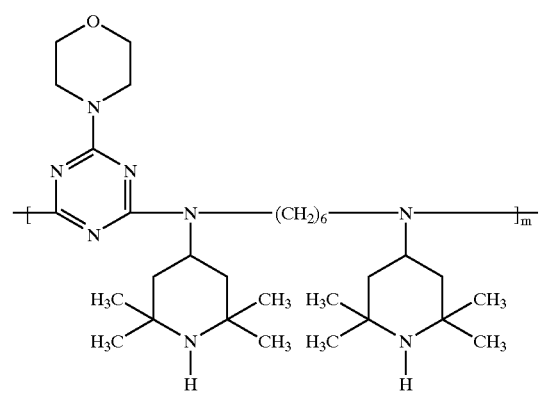
93) 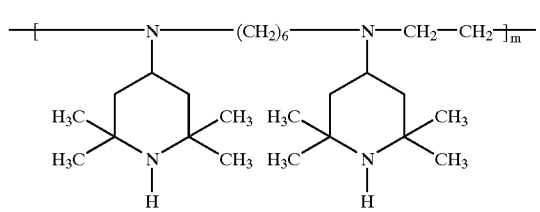
94) 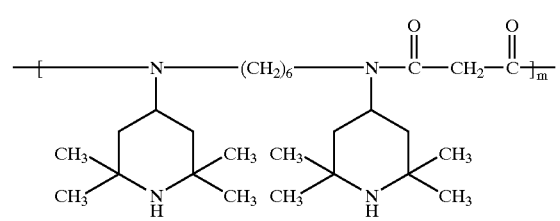
95) 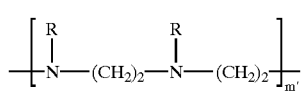 where R = 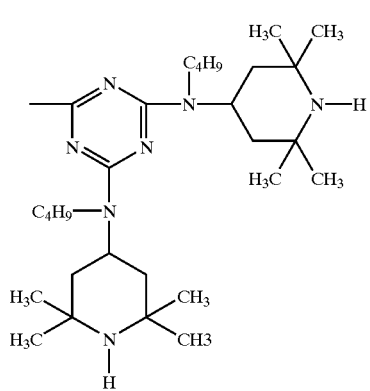

branch in the

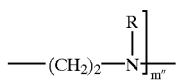

chain, m' and m" are each an integer in the range from 0–200, with the proviso that m'+m"=m.

Further examples of polymeric compounds are products of the reaction of compounds of the formula

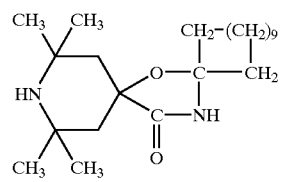

with epichlorohydrin; polyesters made from butane-1,2,3,4-tetracarboxylic acid with a bifunctional alcohol of the formula

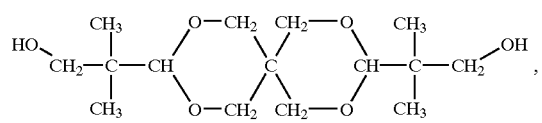

whose carboxyl side chains originating from the tetracarboxylic acid has been esterified by means of 2,2,6,6-tetramethyl-4-hydroxypiperidine; compounds of the formula

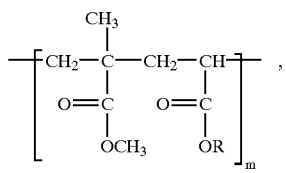

in which approximately one third of the radicals R are —$C_2H_5$ and the others are

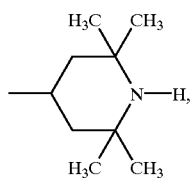

and m is a number in the range from 2 to 200; or copolymers whose recurring unit is built up from 2

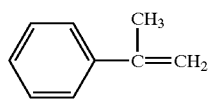

units and 1 each of the units

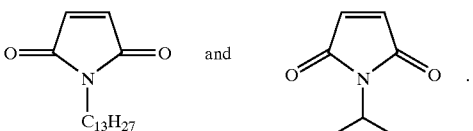

(g') Compounds of the formula X'

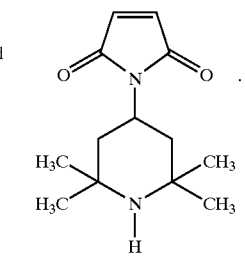

(X')

in which n is the number 1 or 2, G and $G^{11}$ are as defined under (a'), and $G^{14}$ is as defined under (b'), but $G^{14}$ cannot be —CONH—Z and —$CH_2$—CH(OH)—$CH_2$—O—D—O—.

Examples of such compounds are the following:

100)

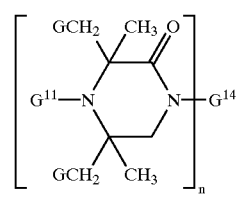

(amine M)

101)

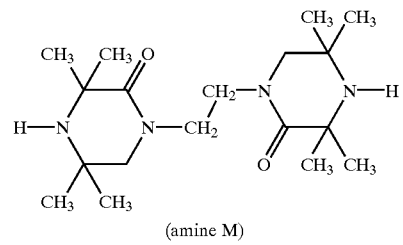

102)

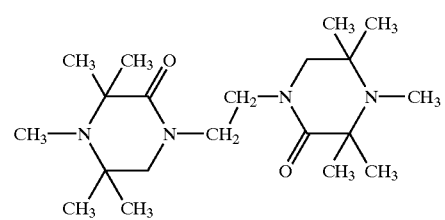

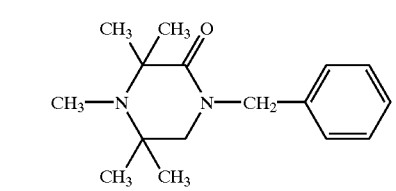

Of interest are compositions comprising as component (c)(ii) or component (c)(iii)(y) a compound of the formula IV' in which n is an integer in the range from 1 to 4, G and $G^1$ are hydrogen, and $G^{11}$ is hydrogen or $C_1$–$C_{18}$alkyl, and $G^{12}$, if n=1, is a radical of the formula —$(C_jH_{2j})$—Si(Z')$_2$ Z", in which j is an integer in the range from 2 to 5, and Z' and Z", independently of one another, are $C_1$–$C_4$alkyl or $C_1$–$C_4$alkoxy, and $G^{12}$, if n=2, is a radical of an aliphatic dicarboxylic acid having 2 to 12 carbon atoms, which may be substituted by —COO$Z^{12}$, where $Z^{12}$ is $C_1$–$C_{20}$alkyl, $G^{12}$, if n=3, is a radical of an aromatic tricarboxylic acid having 9 to 15 carbon atoms, $G^{12}$, if n=4, is a radical of an aliphatic tetracarboxylic acid having 8 to 12 carbon atoms; amines of particular industrial interest from this class are those of the formulae

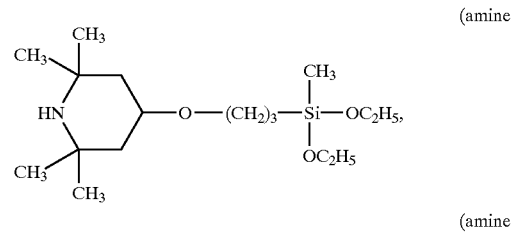
(amine B)

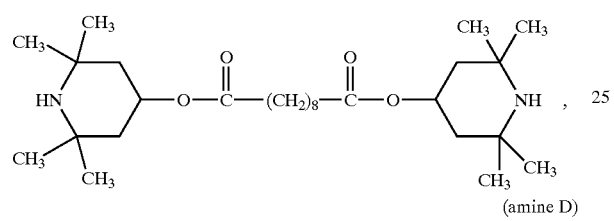
(amine C)

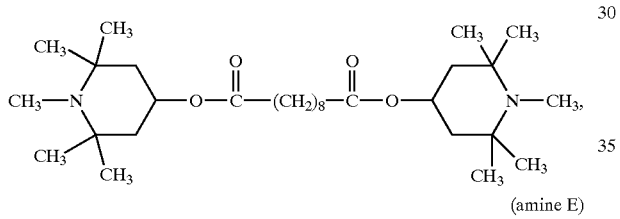
(amine D)

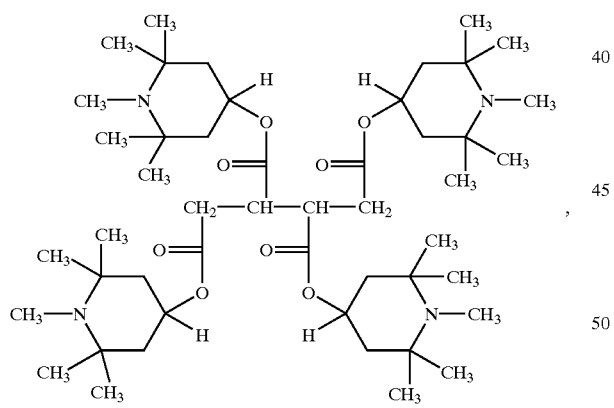
(amine E)

and esters of butane-1,2,3,4-tetracarboxylic acid containing 2 1,2,2,6,6-pentamethyl-4-hydroxypiperidine units and 2 $C_{13}H_{27}$-OH (amine F) units.

Likewise of interest are compositions comprising as component (c)(ii) or component (c)(iii)(y) a compound of the formula V' in which n is 2, G and $G^1$ are hydrogen, $G^{11}$ is hydrogen or methyl, $G^{13}$ is hydrogen or $C_1$–$C_8$alkyl, and $G^{14}$ is $C_2$–$C_8$alkylene or 1-oxo-$C_2$–$C_8$alkylene; an amine of particular industrial interest from this class is the compound of the formula

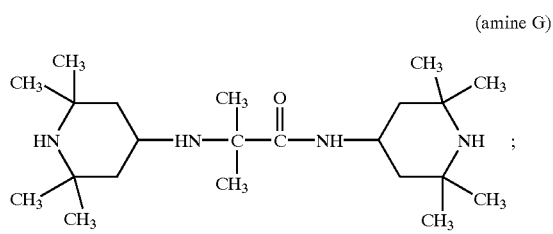
(amine G)

compounds of the formula VIIC in which n is 1, G, $G^1$ and $G^{17}$ are hydrogen, $G^{11}$ is hydrogen or methyl, and $T_1$ and $T_2$, together with the carbon atom bonding them, form a $C_5$–$C_{14}$cycloalkane ring; an amine of particular industrial interest from this class is the compound of the formula

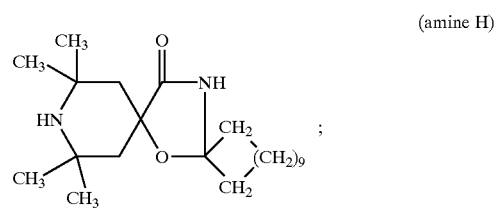
(amine H)

compounds of the formula VIII' in which n is 1 or 2, $G^{18}$ and $G^{19}$ are a group of the formula

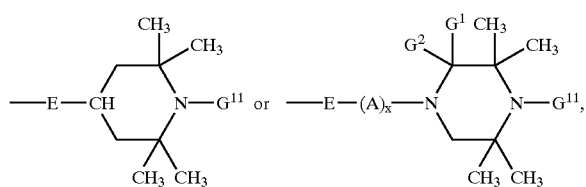

$G^{11}$ is hydrogen or methyl, $G^1$ and $G^2$ are hydrogen or together are a substituent =O, E is —O— or —N$G^{13}$—, A is $C_2$–$C_6$alkylene and x is the number 0 or 1

$G^{13}$ is hydrogen, $C_1$–$C_2$alkyl or cyclohexyl, $G^{20}$, if n=1, is identical to $G^{18}$ and, if n=2, is an —E—B—E— group, in which B is $C_2$–$C_8$alkylene or $C_2$–$C_8$alkylene which is interrupted by 1 or 2 —N($G^{21}$)— groups, $G^{21}$ is $C_1$–$C_{12}$alkyl, cyclohexyl, benzyl or $C_1$–$C_4$hydroxyalkyl or a group of the formula

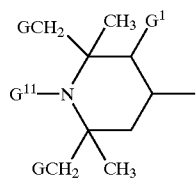

or $G^{21}$ is a group of the formula

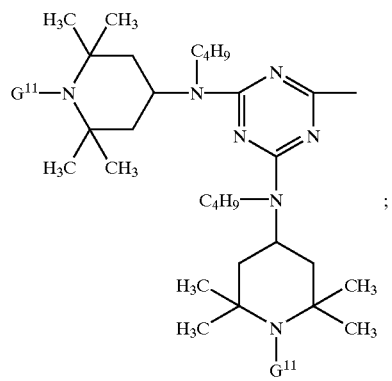

sterically hindered amines of particular industrial interest from this class are the above-described compound (76) [=amine J] and compounds of the formulae

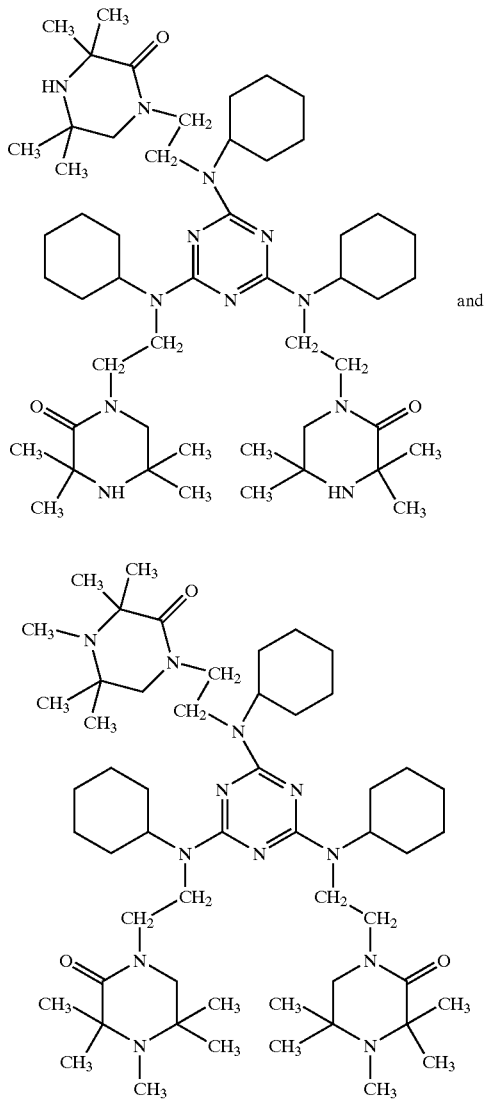

and (amines K and L);

compounds of the formula X', in which n is 2, $G^{11}$ is hydrogen or methyl and $G^{14}$ is $C_2$–$CH_2$alkylene;

an amine of particular industrial interest from this class is the above-described compound (100)[=amine M]; and oligomeric compounds containing 2 to 10 recurring units obtainable by reaction (i') of

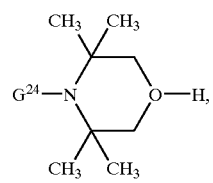

in which $G^{24}$ is $C_2$–$C_5$hydroxyalkyl, with an aliphatic $C_2$–$C_{12}$dicarboxylic acid or a suitable reactive derivate such as a diester, the dichloride or the anhydride;

(j') of a linear oligomeric polyester made from a dialcohol and butane-1,2,3,4-tetra-carboxylic acid with 2,2,6,6-tetramethyl-4-hydroxy-piperidine;

(k') of

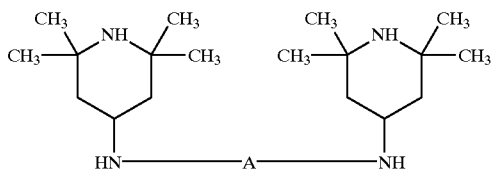

with

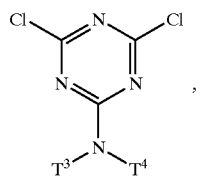

in which A is $C_2$–$C_6$alkylene, $T^3$ is $C_1$–$C_{18}$alkyl or cyclohexyl, $T^4$ is hydrogen or $C_1$–$C_{18}$alkyl, or $T^3$ and $T^4$ together are $C_4$–$C_6$alkylene or $C_3$–$C_5$oxaalkylene;

(l') of $H_2N$—A—NH—A—$NH_2$ with

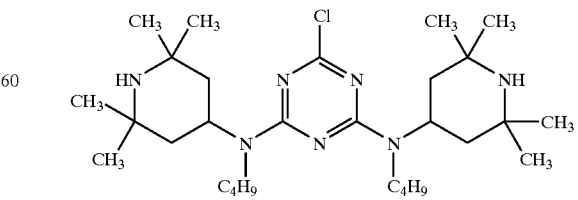

and Br—A—Br, in which A is $C_2$–$C_6$alkylene;

(m') of compounds of the formula
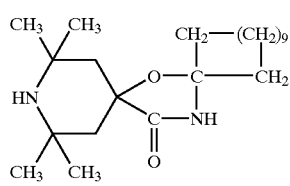
with epichlorohydrin;
(n') of
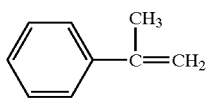
with
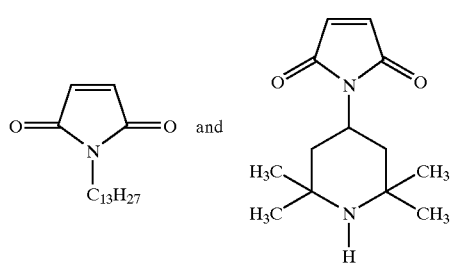
and those of the formula
(o')
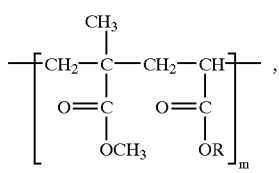
in which approximately one third of the radicals R are —$C_2H_5$ and the others are
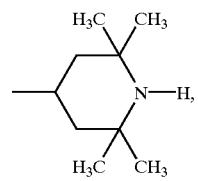
and m is a number in the range from 2 to 10;
oligomeric amines of particular industrial interest also include those of the formulae (m is again a number in the range from 2 to 10)
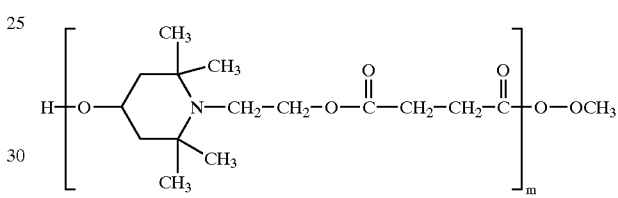
(CAS No. 65447-77-0; amine N);
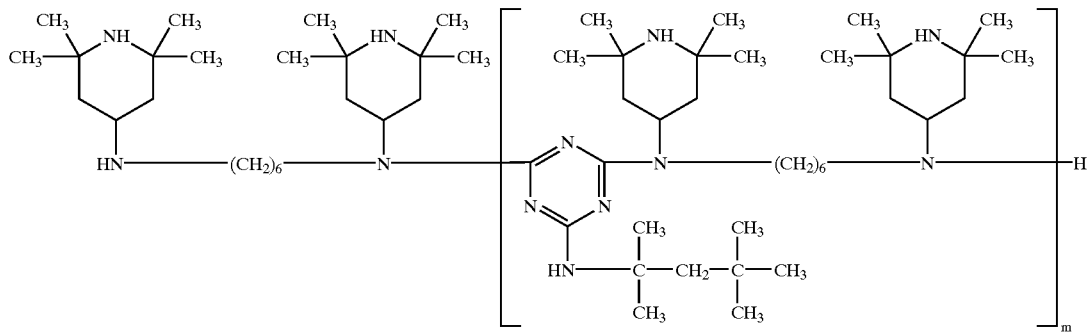
(CAS No. 70624-18-9; amine P);
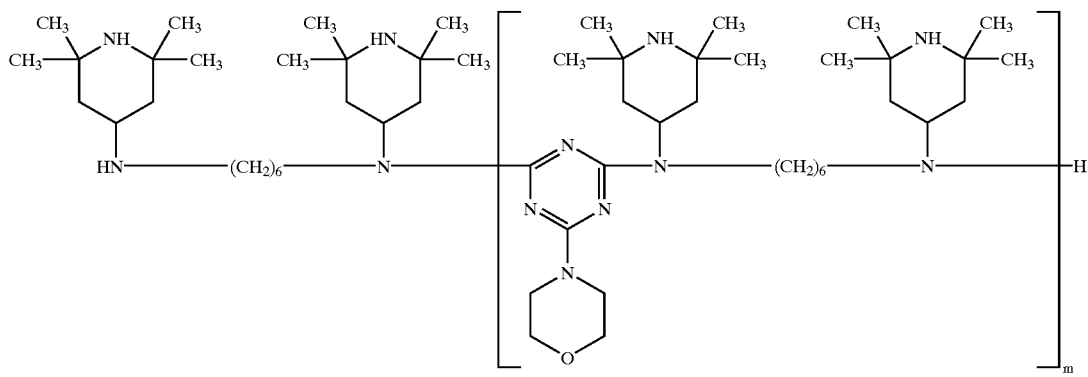

(amine Q);

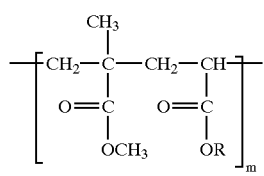

(amine R), in which approximately one third of the radicals R are —C$_2$H$_5$ and the others are

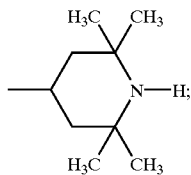

a linear polyester containing 2 to 10 recurring units made from butane-1,2,3,4-tetracarboxylic acid and a dialcohol of the formula

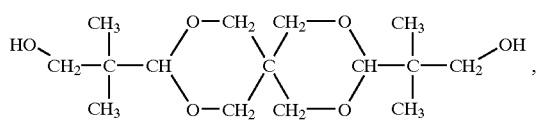

in which the terminal groups and side chains are formed by esterification of the free carboxyl groups using 2,2,6,6-tetramethyl-4-hydroxypiperidine (amine S); a copolymer whose recurring unit is built up from 2

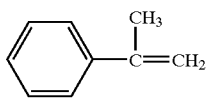

units and 1

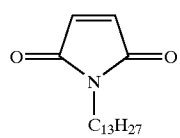

unit and 1

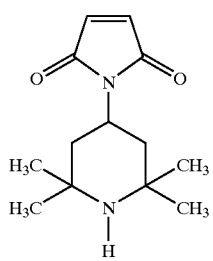

unit (amine T); the product of the reaction of H$_2$N—(CH$_2$)$_2$—NH—(CH$_2$)$_2$—NH$_2$ with

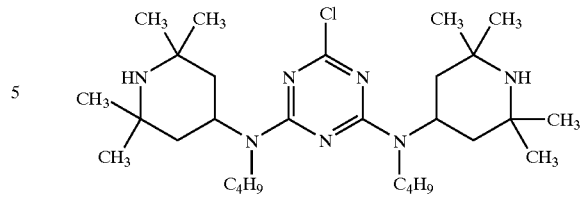

and Br—(CH$_2$)$_2$—Br (amine U); and the product of the reaction of the compound of the formula

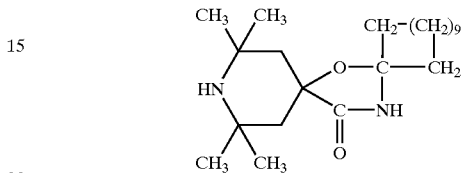

with epichlorohydrin (amine W).

The oligomeric amines are frequently mixtures of compounds which differ from one another in chain length.

Of particular importance is the use of the above-specified amines A, B, C, D, E, F, G, H, J, K, L, M, N, O, P, Q, R, S, T, U, V and W.

For the novel compositions, particular preference is given to the addition of sterically hindered amines whose molecular weight or mean molecular weight $\overline{M}_n$ is in the range from 500 to 10,000, in particular in the range from 1000 to 10,000. Of these, particular emphasis should again be made of sterically hindered amines whose molecular weight or mean molecular weight $\overline{M}_n$ is in the range from 1500 to 10,000, for example in the range from 2000 to 7500.

Particular emphasis should be made of novel compositions in which component (c)(ii) or component (c)(iii)(y) consists of two or more compounds of the sterically hindered amine type.

Special preference is given to compositions comprising as component (c)(ii) or component (c)(iii)(y) a compound from the group consisting of sterically hindered amines in which the molecular weight is greater than 1000 and the compound contains at least one radical of the formula VI or VI'

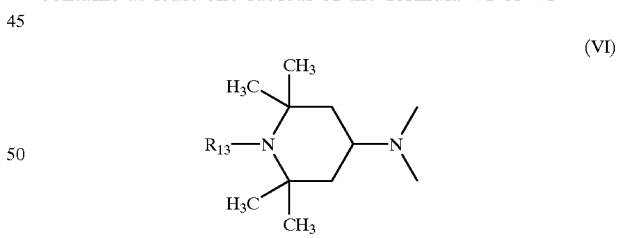

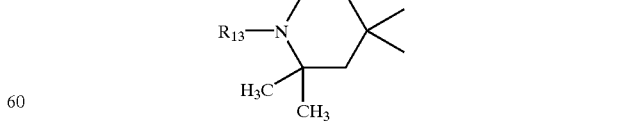

in which

R$_{13}$ is hydrogen or methyl.

Very special preference is given to compositions comprising as component (c)(ii) or component (c)(iii)(y) a compound from the group of sterically hindered amines in which the molecular weight is greater than 1000 and the compound contains at least one radical of the formula VI or VI' and one radical of the formula VII

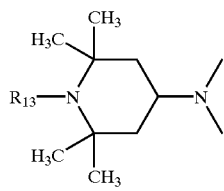
(VI)

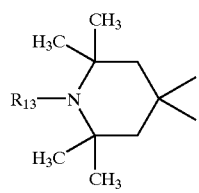
(VI')

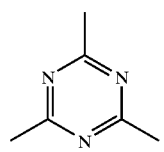
(VII)

in which

R$_{13}$ is hydrogen or methyl.

Of very particular interest are compositions comprising as component (c)(ii) or component (c)(iii)(y) a linear or cyclic condensation product prepared from N,N'-bis(2,2,6,6-tetramethyl -4-piperidyl)hexamethylenediamine and 4-tert-octylamino-2,6-dichloro-1,3,5-triazine [Chimassorb® 944LD (Ciba-Geigy), amine P in the above description]; or a condensation product prepared from 2-chloro-4,6-di(4-n-butylamino-1,2,2,6,6-pentamethylpiperidyl) -1,3,5-triazine and 1,2-bis(3-aminopropylamino)ethane [Chimassorb® 119FL/10 (Ciba-Geigy), compound No. 76].

The sterically hindered amines mentioned are known compounds, and many of them are commercially available.

Of interest are compositions comprising as component (c)(iii)(x) a phenolic antioxidant of the formula II'

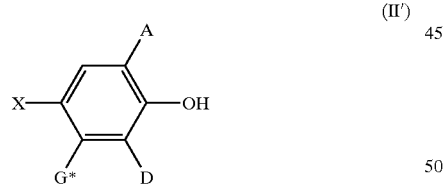
(II')

in which

A is hydrogen, C$_1$–C$_{24}$alkyl, C$_5$–C$_{12}$cycloalkyl, phenyl-C$_1$–C$_4$alkyl, phenyl or a —CH$_2$—S—R$_{12}$ or

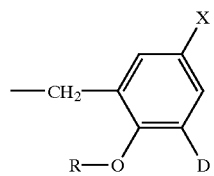

group,

D is C$_1$–C$_{24}$alkyl, C$_5$–C$_{12}$cycloalkyl, phenyl-C$_1$–C$_4$alkyl, phenyl or a —CH$_2$—S—R$_{12}$ group, X is hydrogen, C$_1$–C$_{18}$alkyl or one of the —C$_a$H$_{2a}$—S$_q$—R$_{13}$, —C$_b$H$_{2b}$—CO—OR$_{14}$, —C$_b$H$_{2b}$—CO—N(R$_{16}$)(R$_{17}$), —CH$_2$N(R$_{21}$)(R$_{22}$),

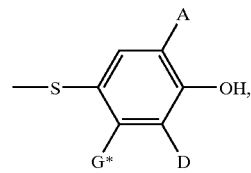

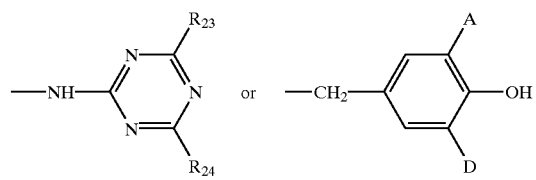

groups,

R is hydrogen or a group of the formula —CO—CH=CH$_2$,

G* is hydrogen or C$_1$–C$_{12}$alkyl,

R$_{12}$ is C$_1$–C$_{18}$alkyl, phenyl or a —(CH$_2$)$_c$—CO—OR$_{15}$ or —CH$_2$CH$_2$OR$_{20}$ group, R$_{13}$ is hydrogen, C$_1$–C$_{18}$alkyl, phenyl, benzyl or a

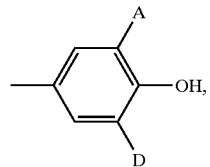

or —(CH$_2$)$_c$—CO—OR$_{15}$ or —CH$_2$—CH$_2$—OR$_{20}$ group,

R$_{14}$ is C$_1$–C$_{30}$alkyl or one of the —CHR$_{18}$—CH$_2$—S—R$_{19}$,

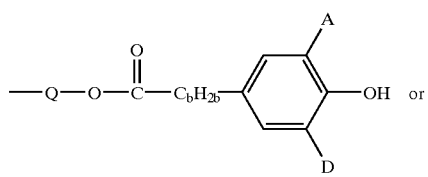 or

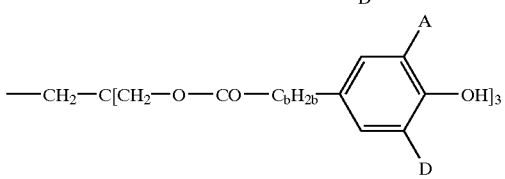

groups, in which Q is C$_2$–C$_8$alkylene, C$_4$–C$_6$thiaalkylene or a —CH$_2$CH$_2$(OCH$_2$CH$_2$)$_d$— group, R$_{15}$ is C$_1$–C$_{24}$alkyl, R$_{16}$ is hydrogen, C$_1$–C$_{18}$alkyl or cyclohexyl, R$_{17}$ is C$_1$–C$_{18}$alkyl, cyclohexyl, phenyl, C$_1$–C$_{18}$alkyl-substituted phenyl or one of the

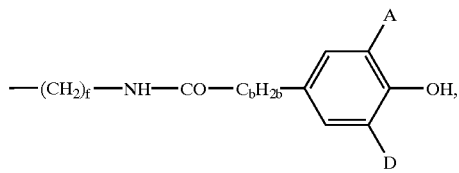

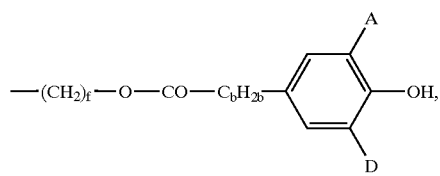

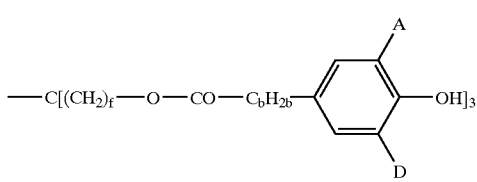

groups, or $R_{16}$ and $R_{17}$ together are $C_4$–$C_8$alkylene, which may be interrupted by —O— or —NH—, $R_{18}$ is hydrogen, $C_1$–$C_4$alkyl or phenyl, $R_{19}$ is $C_1$–$C_{18}$alkyl, $R_{20}$ is hydrogen, $C_1$–$C_{24}$alkyl, phenyl, $C_2$–$C_{18}$alkanoyl or benzoyl, $R_{21}$ is $C_1$–$C_{18}$alkyl, cyclohexyl, phenyl, $C_1$–$C_{18}$alkyl-substituted phenyl or a

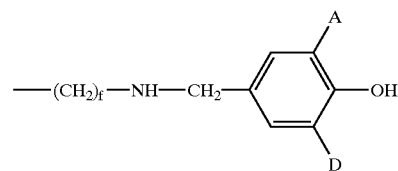

group, $R_{22}$ is hydrogen, $C_1$–$C_{18}$alkyl, cyclohexyl, or a

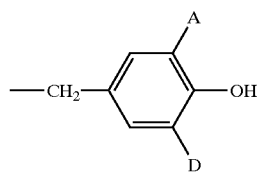

group, or $R_{21}$ and $R_{22}$ together are $C_4$–$C_8$alkylene, which may be interrupted by —O— or —NH—, $R_{23}$ and $R_{24}$ are —S—$C_1$–$C_{18}$alkyl, a 0, 1, 2 or 3, b is 0, 1, 2 or 3, c is 1 or 2, d is 1 to 5, f is 2 to 8 and q is 1, 2, 3 or 4.

Component (c)(iii)(x) is particularly preferably a compound of the formula II' in which A is hydrogen, $C_1$–$C_8$alkyl, cyclohexyl, phenyl or a —$CH_2$—$R_{23}$ or

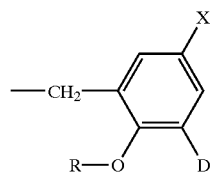

group,

D is $C_1$–$C_8$alkyl, cyclohexyl, phenyl or a —$CH_2$—$R_{24}$ group,

X is hydrogen, $C_1$–$C_8$alkyl or one of the —$C_aH_{2a}$—$S_q$—$R_{13}$, —$C_bH_{2b}$—CO—$OR_{14}$, —$CH_2N(R_{21})(R_{22})$

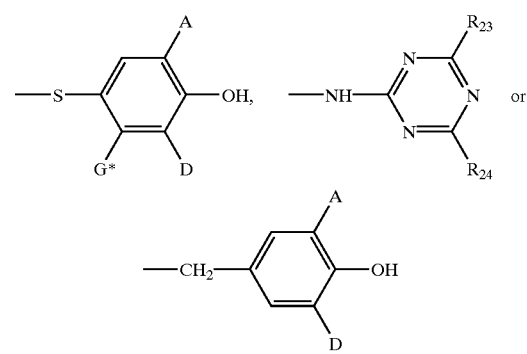

groups, $R_{13}$ is $C_1$–$C_{12}$alkyl, phenyl or a —$(CH_2)_c$—CO—$OR_{15}$ group, $R_{14}$ is $C_1$–$C_{18}$alkyl or a

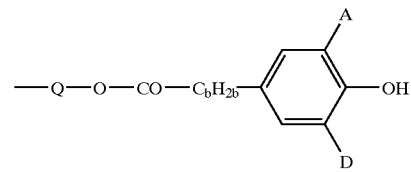

group, in which Q is $C_2$–$C_8$alkylene, —$CH_2$—$CH_2$—S—$CH_2CH_2$ or a —$CH_2CH_2(OCH_2CH_2)_d$— group, $R_{15}$ is $C_1$–$C_{18}$alkyl, $R_{21}$ and $R_{22}$, independently of one another, are hydrogen or $C_1$–$C_{12}$alkyl or $R_{21}$ and $R_{22}$ together are $C_4$–$C_8$alkylene, which may be interrupted by —O— or —NH—, a is 1 or 2, b is 1 or 2, c is 1 or 2, and d is 1, 2 or 3, and $R_{23}$ and $R_{24}$ are —S—$C_1$–$C_{18}$alkyl.

Component (c)(iii)(x) is very particularly a compound of the formula II' in which A is hydrogen, $C_1$–$C_6$alkyl, —$CH_2$—$R_{23}$ or a

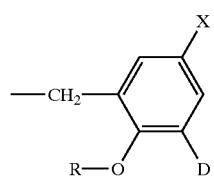

group,

D is hydrogen or $C_1$–$C_{18}$alkyl,

X is hydrogen, $C_1$–$C_4$alkyl, —$CH_2$—$R_{23}$ or a group of the formula

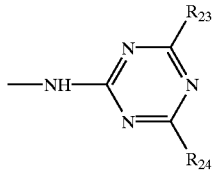

or

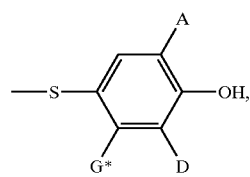

and $R_{23}$ and $R_{24}$ are —S—$C_1$–$C_{18}$alkyl.

Component (c)(iii)(x) can also be a tocopherol or vitamin E derivative, for example α-tocopherol, β-tocopherol, γ-tocopherol, δ-tocopherol or a mixture thereof. Preference is given to vitamin E itsef (α-tocopherol).

Component (c)(iii)(x) can also be an oligomeric phenolic antioxidant of the following type:

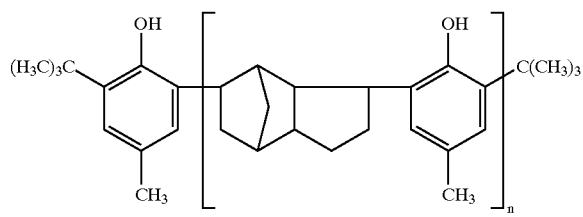

in which the mean molecular weight is from 600 to 700.

Particular preference is given to novel compositions comprising as component (c)(iii)(x) a compound of the formula VIII

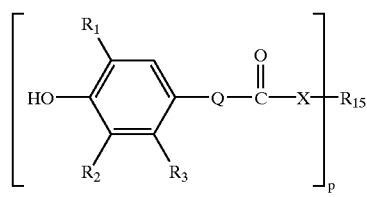

in which $R_1$ is $C_1$–$C_{18}$alkyl, $C_5$–$C_{12}$cycloalkyl, phenyl or $C_7$–$C_9$phenylalkyl, $R_2$ is hydrogen, $C_1$–$C_{18}$alkyl, $C_{5C12}$cycloalkyl, phenyl or $C_7$–$C_9$phenylalkyl, $R_3$ is hydrogen or methyl, Q is $C_mH_{2m}$ or

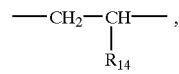

$R_{14}$ is $C_1$–$C_8$alkyl,

X is oxygen or —NH—, m is the number 0, 1, 2 or 3, p is the number 1, 2 or 4, and
  if p is 1,
    $R_{15}$ is $C_8$–$C_{20}$alkyl or $C_5$–$C_{12}$cycloalkyl, and
  if p is 2 and X is oxygen,
    $R_{15}$ is $C_2$–$C_8$alkylene or $C_4$–$C_8$alkylene which is interrupted by oxygen or sulfur; and
  if p is 2 and X is —NH—,
    $R_{15}$ is a direct bond, $C_2$–$C_8$alkylene or $C_4$–$C_8$alkylene which is interrupted by oxygen or sulfur; and
  if p is 4,
    $R_{15}$ is $C_4$–$C_{10}$alkanetetrayl.

Preferred compounds of the formula I or II as component (c)(iii)(x) in the novel compositions are the same as for component (c)(i).

Especial preference is given to compositions comprising as component (c)(iii)(x) a compound of the formula I, II or VIII in which $R_1$ and $R_2$ are tert-butyl and m is 2.

Of very special interest are compositions comprising as component (c)(iii)(x) Irganox® 1010 (Ciba-Geigy), Irganox® MD 1024 (Ciba-Geigy) and Irganox® 1076 (Ciba-Geigy).

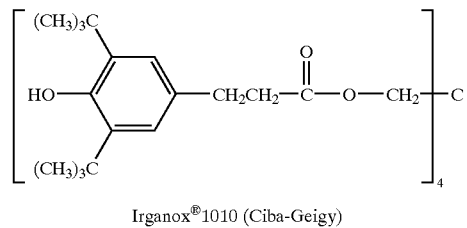

Irganox®1010 (Ciba-Geigy)

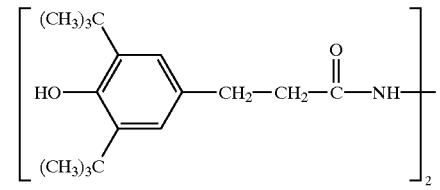

Irganox®MD 1024 (Ciba-Geigy)

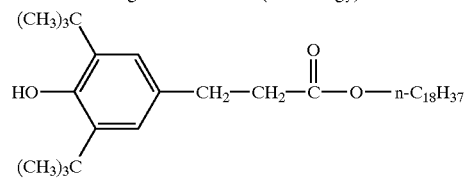

Irganox®1076 (Ciba-Geigy)

Preference is furthermore given to compositions comprising as component (c) a component (i) or a component (iii).

Of very special interest are compositions comprising as component (b) tris(2,4-di-tert-butylphenyl) phosphite, bis(2,4-di-tert-butyl-6-methyl) ethyl phosphite or a compound of the formula Ph-3 or Ph-11

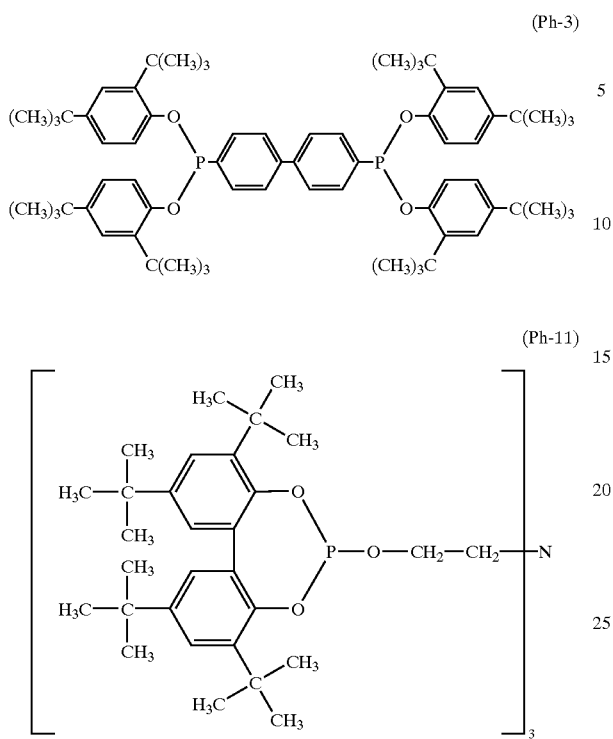

as component (c)(i) a compound of the formula I in which
n is 3,
R₁ and R₂ are tert-butyl,
R₃ is hydrogen, and

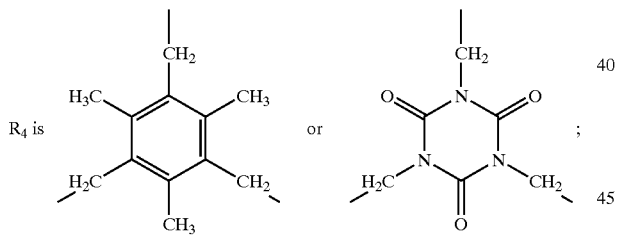

as components (c)(ii) and (c)(iii)(y) linear or cyclic condensation products prepared from N,N'-bis(2,2,6,6-tetramethyl-4-piperidyl)hexamethylenediamine and 4-tert-octylamino -2,6-dichloro-1,3,5-triazine; or a condensation product prepared from 2-chloro4,6-di(4-n-butylamino- 1,2,2,6,6-pentamethylpiperidyl)-1,3,5-triazine and 1,2-bis(3-aminopropyl -amino)ethane; and as component (c)(iii)(x) is

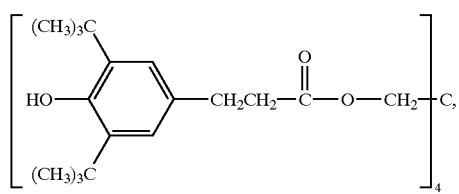

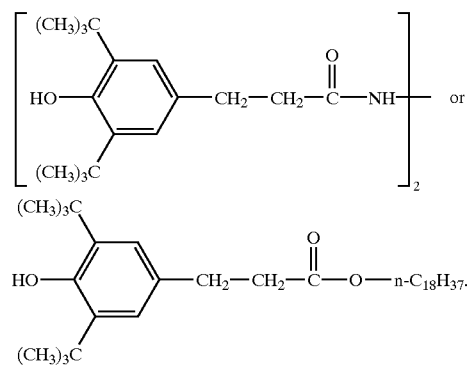

Components (b) and (c) are suitable for stabilizing polyolefins which are in permanent contact with extracting media.

Examples of polyolefins are:
1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene; furthermore polyethylene (which can be crosslinked, if desired), for example high density polyethylene (HDPE), high density polyethylene of high molecular weight (HDPE-HMW), high density polyethylene of ultrahigh molecular weight (HDPE-UHMW), medium density polyethylene (MDPE), low density polyethylene (LDPE), linear low density polyethylene (LLDPE), (VLDPE) and (ULDPE).

Polyolefins, ie. polymers of monoolefins, as mentioned by way of example in the previous paragraph, in particular polyethylene and polypropylene, can be prepared by various processes, in particular by the following methods:

a) by means of free radicals (usually at high pressure and high temperature), b) by means of a catalyst, where the catalyst usually contains one or more metals from group IVb, Vb, VIb or VIII. These metals usually contain one or more ligands, such as oxides, halides, alkoxides, esters, ethers, amines, alkyls, alkenyls and/or aryls, which can be either π- or σ-coordinated. These metal complexes can be free or fixed to supports, for example to activated magnesium chloride, titanium(III) chloride, aluminum oxide or silicon oxide. These catalysts can be soluble or insoluble in the polymerization medium. The catalysts can be active as such in the polymerization or further activators can be used, for example metal alkyls, metal hydrides, metal alkyl halides, metal alkyl oxides or metal alkyl oxanes, where the metals are elements from groups Ia, IIa and/or IIIa. The activators can have been modified, for example, by means of further ester, ether, amine or silyl ether groups. These catalyst systems are usually known as Phillips, Standard Oil Indiana, Ziegler(-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene, propylene-isobutylene, ethylene-but-1-ene, ethylene-hexene, ethylene-methylpentene, ethylene-heptene, ethylene-octene, propylene-butadiene, isobutylene-isoprene, ethylene-alkyl acrylate, ethylene-alkyl methacrylate, ethylene-vinyl acetate copolymers or copolymers thereof with carbon monoxide or ethylene-acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers mentioned in 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and polyalkylene-carbon monoxide copolymers with an alternating or random structure, and mixtures thereof with other polymers, for example polyamides.

4. Hydrocarbon resins (for example $C_5$–$C_9$), including hydrogenated modifications thereof (for example tackifying resins) and mixtures of polyalkylenes and starch.

Preferred polyolefins are polyethylene, polypropylene and copolymers thereof with monoolefins and diolefins.

Particular mention should be made of the action of the stabilizer mixture comprising a component (b) and a component (c) against oxidative and thermal degradation of polyolefins, as occur during the processing of thermoplastics. The polyolefins stabilized in this way are in addition distinguished by excellent chemical resistance to extracting media with which they are in permanent contact.

Component (b) is preferably added to the polyolefin to be stabilized in an amount of from 0.02 to 0.6%, in particular from 0.05 to 0.2%, and component (c) is preferably added in an amount of from 0.02 to 1.0%, in particular from 0.05 to 0.3%, based on the weight of the polyolefin to be stabilized.

If component (c) is component mixture (c)(iii), component (c)(iii)(x) is preferably added to the polyolefin to be stabilized in an amount of from 0.02 to 0.5%, in particular from 0.05 to 0.2%, and component (c)(iii)(y) is preferably added in an amount of from 0.02 to 1.0%, in particular from 0.05 to 0.3%, based on the weight of the polyolefin to be stabilized.

In addition to components (b) and (c), the novel compositions can comprise further costabilizers (additives), for example the following:

1. Antioxidants
   1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or side-chain-branched nonylphenols, for example 2,6-dinonyl-4-methylphenol, 2,4-dimethyl-6-(1'-methyl-undec-1'-yl)phenol, 2,4-dimethyl-6-(1'-methylheptadec-1'-yl)phenol, 2,4-dimethyl-6-(1'-methyltridec-1'-yl)phenol and mixtures thereof.
   1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.
   1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.
   1.4. Tocopherols, for example α-tocopherol, β-tocopherol, γ-tocopherol, δ-tocopherol and mixtures thereof (vitamin E).
   1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.
   1.6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methyl-cyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.
   1.7. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate.
   1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.
   1.9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
   1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4- hydroxyphenylethyl)-1,3,5-triazine, 1,3,5-tris(3,5-di-tert-butyl-4-hydroxyphenyl-propionyl)hexahydro-1,3,5-triazine, 1,3,5-tris(3,5-dicyclohexyl-4-hydroxybenzyl)-isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzyl-phosphonate, calcium salt of monoethyl 3,5-di-tert-butyl-4-hydroxybenzyl phosphonate.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with monohydric or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.14. Esters of β-(5-tert-butyl-4-hydroxy-3-methylphenyl)propionic acid with monohydric or polyhydric alcohols, for example methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol[, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-(2.2.2]octane.

1.16. Esters of 3,5-di-tert-butyl-4-hydroxylphenylacetic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.17. Amides of β-(3,5-di-tert-butyl-4-hydroxyphenyl) propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine, N,N'-bis[2-(3-[3,5-di-tert-butyl-4-hydroxyphenyl]propionyloxy)ethyl]oxalamide.

1.18. Ascorbic acid (vitamin C).

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di-(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino) propane, (o-tolyl)biguanide, di[4-(1',3'-dimethylbutyl) phenyl]amine, tert-octylated N-phenyl-1-naphthylamine, mixture of mono- and dialkylated tert-butyl/tert-octyl-diphenylamines, mixture of mono- and dialkylated nonyldiphenylamines, mixture of mono- and dialkylated dodecyldiphenylamines, mixture of mono- and dialkylated isopropyl/isohexyldiphenylamines, mixture of mono- and dialkylated tert-butyldiphenylamines, 2,3-dihydro-3,3-dimethyl-4H-1,4-benzothiazine, phenothiazine, mixture of mono- and dialkylated tert-butyl/tert-octylphenothiazines, mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin4-yl)sebacate, 2,2,6,6-tetramethylpiperidin-4-one, 2,2,6,6-tetramethylpiperidin-4-ol.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octoxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)-phenyl)--5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-yl phenol]; transesterification product of 2-[3'-tert-butyl-5-(2-methoxycarbonylethyl)-2'-hydroxyphenyl]benzotriazole with polyethylene glycol 300; [R—CH$_2$CH$_2$—COO(CH$_2$)$_3$—]$_2$ where R=3'-tert-butyl-4'-hydroxy-5'-2H-benzotriazol-2-yl phenyl.

2.2. 2-Hydroxybenzophenones, for example the 4-hydroxy, 4-methoxy, 4-Octoxy, 4-decyloxy, 4-dodecyloxy, 4-benzyloxy, 4,2',4'-trihydroxy and 2'-hydroxy-4,4'-dimethoxy derivatives.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of -phenyl-4-lauroyl-5-hydroxypyrazole, if desired with additional ligands.

2.6. Sterically hindered amines, for example bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, the product of the condensation of N,N'-bis(2,2,6,6-tetramethyl-4-piperidyl) hexamethylenediamine and 4-morpholino-2,6-dichloro-1,3,5-triazine, the product of the condensation of 2-chloro-4,6-di-(4-n-butylamino-2,2,6,6-tetramethylpiperidyl)-1,3,5-triazine and 1,2-bis(3-aminopropylamino)ethane, the product of the condensation of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, the product of the condensation of N,N'-bis(2,2,6,6-tetramethyl-4-piperidyl) hexamethylenediamine and 4-cyclohexylamino-2,6-dichloro-1,3,5-triazine, the product of the condensation of 1,2-bis(3-aminopropylamino)ethane and 2,4,6-trichloro-1,3,5-triazine, and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, and the product of the reaction of 7,7,9,9-tetramethyl-2-cycloundecyl-1-oxa-3,8-diaza-4-oxospiro[4,5]decane and epichlorohydrin.

2.7. Oxalamides, for example 4,4'-dioctyloxyoxanilide, 2,2' diethoxyoxanilide, 2,2'-di-octyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyl-oxanilide, and mixtures of o- and p-methoxy- and of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4(3-butoxy-2-hydroxypropoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalodihydrazide, oxanilide, isophthalodihydrazide, sebacobisphenyl hydrazide, N,N'-diacetyladipodihydrazide, N,N'-bissalicyloyloxalodihydrazide and N,N'-bissalicyloylthiopropionodihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythrityl diphosphite, tris(2,4-di-tert-butylphenyl)phosphite, diisodecyl pentaerythrityl diphosphite, bis(2,4-di-tert-butylphenyl) pentaerythrityl diphosphite, bis(2,6-di-tert-butyl-4-methylphenyl)pentaerythrityl diphosphite, bis-isodecyloxy pentaerythrityl diphosphite, bis(2,4-di-tert-butyl-6-methylphenyl)pentaerythrityl diphosphite, bis(2,4,6-tri-tert-butylphenyl)pentaerythrityl diphosphite, tristearyl sorbityltriphosphite, tetrakis(2,4-di-tert-butylphenyl) 4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite and bis(2,4-di-tert-butyl-6-methylphenyl) ethyl phosphite.

5. Hydroxylamines, for example N,N-dibenzylhydroxylamine, N,N-diethylhydroxylamine, N,N- dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine made from hydrogenated tallow fatty amines.

6. Nitrones, for example N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecyl nitrone, N-hexadecyl-alpha-heptadecyl nitrone, N-octadecyl-alpha-pentadecyl nitrone, N-hepta-decyl-alpha-heptadecyl nitrone, N-octadecyl-alpha-hexadecyl nitrone, nitrones derived from N,N-dialkylhydroxylamines prepared from hydrogenated tallow fatty amines.

7. Thiosynergists, for example dilauryl thiodipropionate and distearyl thiodipropionate.

8. Peroxide scavengers, for example esters of β-thiodipropionic acid, for example the lauryl, stearyl, myristyl and tridecyl esters, mercaptobenzimidazole, the zinc salt of 2-mercaptobenzimidazole, zinc dibutyldithiocarbamate, dioctadecyl disulfide and pentaerythrityl tetrakis(β-dodecylmercapto)propionate.

9. Polyamide stabilizers, for example copper salts in combination with iodides and/or phosphorus compounds and salts of divalent manganese.

10. Basic costabilizers, for example melamine, polyvinylpyrrolidone, dicyandiamide, triallyl cyanurate, urea derivatives, hydrazine derivatives, amines, polyamides, polyurethanes, alkali and alkaline earth metal salts of higher fatty acids, for example calcium stearate, zinc stearate, magnesium behenate, magnesium stearate, sodium ricinoleate, potassium palmitate, antimony pyrocatecholate and tin pyrocatecholate.

11. Nucleating agents, for example inorganic substances, for example talc, metal oxides, such as titanium dioxide or magnesium oxide, phosphates, carbonates or sulfates, preferably of alkaline earth metals; organic compounds, such as mono- or polycarboxylic acids, and salts thereof, for example 4-tert-butylbenzoic acid, adipic acid and diphenylacetic acid, sodium succinate or sodium benzoate; polymeric compounds, for example ionic copolymers ("ionomers").

12. Fillers and reinforcing agents, for example calcium carbonate, silicates, glass fibres, glass beads, asbestos, talc, kaolin, mica, barium sulfate, metal oxides and hydroxides, carbon black, graphite, sawdust and flours or fibres of other natural products, synthetic fibres.

13 Other additives, for example plasticizers, lubricants, emulsifiers, pigments, rheology additives, catalysts, flow aids, optical brighteners, flameproofing agents, antistatic and blowing agents.

14. Benzofuranones and indolinones, as described, for example, in U.S. Pat. Nos. 4,325,863, 4,338,244, 5,175,312, 5,216,052, 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one and 3-(3,5-dimethyl-4-pivaloyloxyphenyl)-5,7-di-tert-butylbenzofuran-2-one.

With the exception of the fillers and reinforcing agents (point 12 in the list), the costabilizers are added to the polyolefin in, for example, concentrations of from 0.01 to 10%, based on the total weight of the polyolefin to be stabilized.

The fillers and reinforcing agents (point 12 in the list) such as, for example, talc, calcium carbonate, mica or kaolin are added to the polyolefin in, for example, concentrations of from 0.01 to 40%, based on the total weight of the polyolefin to be stabilized.

Fillers and reinforcing agents (point 12 in the list) such as, for example, metal hydroxides, in particular aluminium hydroxide or magnesium hydroxide, are added to the polyolefin in, for example, concentrations of from 0.01 to 60%, based on the total weight of the polyolefin to be stabilized.

Carbon black as filler is expediently added to the polyolefin in concentrations of from 0.01 to 5%, based on the total weight of the polyolefin to be stabilized.

Glass fibres as reinforcing agents are expediently added to the polyolefin in concentrations of from 0.01 to 20%, based on the total weight of the polyolefin to be stabilized.

In addition to components (a), (b) and (c), further preferred compositions also comprise further additives, in particular UV absorbers and light stabilizers (point 2 in the list); amides of β-(3,5-di-tert-butyl-4-hydroxyphenyl)propionic acid (metal deactivators, point 1.17 in the list); nucleating agents (point 11 in the list) and/or fillers and reinforcing agents (point 12 in the list).

Of particular interest as additional additives are metal deactivators, for example N,N'-bis-(3,5-di-tert-butyl-4-hydroxyphenylpropionyl)hydrazine [Irganox® MD1024 (Ciba-Geigy)] or N,N'-bis[2-(3-[3,5-di-tert-butyl-4-hydroxyphenyl]propionyloxy)ethyl]oxamide [Naugardg® XL-1 (Uniroyal)].

Components (b) and (c) and any further additives used are incorporated into the polyolefin by known methods, for example before or during shaping or alternatively by applying the dissolved or dispersed stabilizer mixture to the polyolefin, if necessary with subsequent evaporation of the solvent. The stabilizer mixture of components (b) and (c) can also be added to the polyolefins to be stabilized in the form of a masterbatch in which these components are present, in a concentration of from 2.5 to 25% by weight.

The stabilizer mixtures comprising components (b) and (c) can also be added before or during the polymerization or before the crosslinking.

The stabilizer mixtures comprising components (b) and (c) can be incorporated into the polyolefin to be stabilized in pure form or encapsulated in waxes, oils or polymers.

Components (b) and (c), or mixtures thereof, can also be sprayed onto the polyolefin to be stabilized. They are capable of diluting other additives (for example the above-mentioned conventional additives) or melts thereof, so that they can also be sprayed onto the polyolefin to be stabilized together with these additives. A particularly advantageous procedure is addition before spraying, during deactivation of the polymerization catalysts, in which case for example, the steam for deactivation can be used for the spraying.

In the case of polyolefins polymerized in spherical form, it may be advantageous, for example, to apply components (b) and (c), if desired together with other additives, by spraying.

The polyolefins stabilized in this way can be used in a wide variety of forms, in particular as thick-walled polyolefin mouldings, which are in permanent contact with extracting media, for example pipes for liquids or gases, sheeting, geomembranes, tapes, profiles or tanks.

The present invention also relates to a process for stabilizing thick-walled polyolefin mouldings which are in permanent contact with extracting media, which comprises incorporating or applying a mixture comprising a component (b) and a component (c) to these mouldings.

Preference is given to a process for stabilizing thick-walled polyolefin mouldings which are in permanent contact with extracting media in which the thick-walled polyolefin mouldings have a wall thickness of from 1 to 50 mm, in particular from 1 to 30 mm, for example from 2 to 10 mm.

Also of particular interest is a process for stabilizing thick-walled polyolefin mouldings which are in permanent contact with extracting media, in which the thick-walled polyolefin mouldings are pipes or geomembranes.

The term geomembrane is taken to mean sheeting which is used, for example, in landfill sites and must have, for example, a life of up to 300 years.

Extracting media are, for example, liquid or gaseous inorganic or organic materials.

Examples of gaseous inorganic materials are oxygen; nitrogen; nitrogen oxides, for example NO, laughing gas or $NO_2$; sulfur oxides, for example sulfur dioxide; halogens, for example fluorine or chlorine; Brönsted acids, for example hydrofluoric acid, hydrochloric acid, hydrobromic acid, hydroiodic acid or hydrocyanic acid, or bases, for example ammonia.

Examples of gaseous organic materials are $C_1$–$C_4$alkanes, for example methane, ethane, propane or butane; carbon monoxide; carbon dioxide; or phosgene.

Examples of liquid inorganic materials are water, chlorinated drinking water or aqueous saline solutions, for example sodium chloride solution (brine) or sodium sulfate solution; bromine; acid halides, for example titanium tetrachloride, thionyl chloride, nitrosyl chloride or trimethylsilyl chloride; caustic lyes, for example aqueous sodium hydroxide (NaOH) solution, aqueous potassium hydroxide (KOH) solution, aqueous ammonia solution, aqueous sodium bicarbonate solution or aqueous soda solution.

Examples of liquid organic materials are organic solvents and liquid organic reagents.

Examples of organic solvents are aliphatic hydrocarbons, for example pentane, hexane, heptane, octane, gasoline, nonane or decane; alcohols, for example methanol, ethanol, isopropanol, butanol, pentanol, amyl alcohol, cyclohexanol, pentaerythritol, ethylene glycol, ethylene diglycol, methylcellosolve, polyethylene glycol or glycerol; ketones, for example acetone, diethyl ketone, methyl ethyl ketone, diphenyl ether or cyclohexanone; ethers, for example diethyl ether, dibutyl ether, tetrahydrofuran or dioxane; aromatic hydrocarbons, for example benzene, toluene or xylene; heterocyclic solvents, for example furan, pyridine, 2,6-lutidine or thiophene; dipolar aprotic solvents, for example dimethylformamide, diethylacetamide or acetonitrile; or surfactants.

Other extracting media according to the present invention are mixtures and solutions, in particular aqueous mixtures, emulsions or solutions, of liquid or gaseous inorganic and organic materials as listed above.

Of particular interest are extracting media which are of importance in the chemical industry or in landfill sites.

A preferred embodiment of the present invention is therefore the use of a mixture comprising a component (b) and a component (c) for stabilizing thick-walled polyolefin mouldings which are in permanent contact with extracting media.

The examples below illustrate the invention in greater detail. The parts and percentages are by weight.

EXAMPLE 1

Stability of polyethylene which is in permanent contact with water and which has been stabilized by means of a component (b) and a component (c)(i).

The unstabilized medium-density polyethylene (PE-MD) used has the material properties summarized in Table 1.

TABLE 1

Material properties of the polyethylene at 23° C.

| Property | Value | Unit | Test method |
|---|---|---|---|
| Density | 0.934 | g/cm$^3$ | ISO 1872 |
| MFI 190/2.16 | 0.15 | g/10 min | ISO 1133 |
| MFI 190/5.00 | 0.55 | g/10 min | |
| Yield stress $\sigma_S$ | 18 | N/mm$^2$ | ISO 6259 |
| Elongation $\epsilon_S$ | 9 | % | ISO 6259 |
| Elongation at break $\epsilon_r$ | >600 | % | ISO 6259 |
| Tangential modulus | 550 | N/mm$^2$ | ISO 6259 |
| Hardness | 58 | Shore D | ISO 868 |
| Vicat softening point | 118 | ° C. | ISO 306 A-50 |
| Crystalline melting point | 123–127 | ° C. | DSC |

0.1% by weight of calcium stearate and the stabilizers listed in Table 2 are added in dry form to the polyethylene polymer removed directly from the reactor, and are incorporated for 2 minutes in a Pappenmaier mixer (type 20) (Examples 1a, 1b and 1c).

TABLE 2

| Example | Stabilizer | Amount (% by weight) | Molar Mass (g/mol) | m.p. (° C.) |
|---|---|---|---|---|
| Example 1a | Irgafos 168[a] | 0.1 | 647 | 180–185 |
| | Irganox 1010[b] | 0.1 | 1178 | 110–125 |
| Example 1b | Irgafos 168[a] | 0.1 | 647 | 180–185 |
| | Irganox 1330[c] | 0.1 | 775 | 241–245 |
| Example 1c | Irgafos 168[a] | 0.1 | 647 | 180–185 |
| | Irganox 3114[d] | 0.1 | 784 | 218–223 |

[a]Irgafos ® 168 (Ciba-Geigy) is tris(2,4-di-tert-butylphenyl) phosphite (formula Ph-2).
[b]Irganox ® 1010 (Ciba-Geigy) is the pentaerythrityl ester of 3-(3,5-di-tert-butyl-4-hydroxyphenylpropionic acid.
[c]Irganox ® 1330 (Ciba-Geigy) is 1,3,5-tris(3,5-di-tert-butyl-4-hydroxybenzyl)-2,4,6-trimethylbenze.
[d]Irganox ® 3114 (Ciba-Geigy) is 1,3,5-tris(3,5-di-tert-butyl-4-hydroxybenzyl) iso-cyanurate.

In an extruder from Dolci, Milan (screw geometry (L/D)= 35, screw speed 55 revolutions/minute, maximum die temperature 190° C., cooling of the feed zone), the stabilized polyolefin is homogenized and converted into about 60 kg of granules per formulation. For the extraction experiments in water, test sheets measuring 200 mm×150 mm×2 mm are pressed out of the granules of the individual formulations (Examples 1a, 1b and 1c) using the machine parameters laid down in Table 3

TABLE 3

Machine parameters for test sheets

| | |
|---|---|
| Melting time (min) | 4 |
| Pressing temperature (° C.) | 180 |
| Pressing force (kN) | 100 |
| Pressing time (mm) | 4 |
| Cooling time (min) | 5 |
| Cooling medium | water | by means of a bench press. In order to simplify demoulding of the test sheets, the pressing operation is carried out between two aluminium foils.

The stabilizer extraction experiments are carried out using deionized water. The extraction container is conditioned in a fan-assisted oven from Heraeus (Hanau, Germany) at a maximum temperature deviation of 1.5° C. For the extraction experiments below the boiling point of water, glass vessels are used. At a water temperature of 105° C., pressurized containers of stainless steel are used. Owing to the risk of oversaturation of the water with stabilizer, the amount of liquid for the experiments is set at about 400 ml for about 70 g of polymer, and the water is replaced by fresh water at regular intervals, i.e. after each sample is taken.

The test sheets are exposed to the above-described experimental conditions for up to 16,032 hours (668 days). When the extraction experiments are complete, the oxidation temperature ($T_{ox}$) of the test sheets is determined. The determination of the oxidation temperature is carried out by means of a DuPont 910 differential scanning calorimeter from TA Instruments (Alzenau, Germany) and using from 5 to 10 mg of sample and describes the commencement of thermal decomposition of the polyolefin sample in a dynamic experiment. These dynamic experiments are carried out in open aluminium crucibles at a heating rate of 10° C./min and at an initial temperature of 30° C. in a normal atmosphere. For the temperature range up to 260° C., the calibration standard used is indium (melting point $T_s$=156.8° C.; enthalpy of melting $\Delta H_S$=26.8 J/g). The higher the oxidation temperature ($T_{ox}$), the better the polyolefins are stabilized and the more stable the polyolefins are to extracting water which is in permanent contact with the polyolefins. The results are summarized in Tables 4 and 5.

TABLE 4

Extraction experiments in water at 95° C.

| Extraction duration | Oxidation temperature ($T_{ox}$) in ° C. | | |
|---|---|---|---|
| (hours) | Example 1a | Example 1b | Example 1c |
| 0 | 256.9 | 255.1 | 247.4 |
| 2112 | 231.9 | 247.3 | 242.7 |
| 4272 | 223.5 | 245.6 | 241.1 |
| 7488 | 220.1 | 243.1 | 235.2 |
| 16032 | 214.4 | 236.2 | 227.2 |

TABLE 5

Extraction experiments with water at 105° C.

| Extraction duration | Oxidation temperature ($T_{ox}$) in ° C. | | |
|---|---|---|---|
| (hours) | Example 1a | Example 1b | Example 1c |
| 0 | 256.9 | 255.1 | 247.4 |
| 1915 | 237.4 | 240.9 | 238.1 |
| 4080 | 216.8 | 231.5 | 234.5 |
| 6000 | 216.5 | 222.2 | 230.5 |

EXAMPLE 2

Stability of polyethylene which is in permanent contact with water and which has been stabilized by means of a component (b) and a component (c)(iii).

The stabilizers shown in Table 6 are incorporated into the medium-density polyethylene (PE-MD) analogously to Example 1 (Examples 2a, 2b and 2c).

TABLE 6

| Example | Stabilizer | Amount (% by wt.) | Molar mass (g/mol) | m.p. (° C.) |
|---|---|---|---|---|
| Example 2a | Irgafos 168[a)] | 0.10 | 647 | 180–185 |
| | Irganox 1010[b)] | 0.10 | 1178 | 110–125 |

TABLE 6-continued

| Example | Stabilizer | Amount (% by wt.) | Molar mass (g/mol) | m.p. (° C.) |
|---|---|---|---|---|
| Example 2b | Irgafos 168[a)] | 0.10 | 647 | 180–185 |
| | Irganox 1010[b)] | 0.05 | 1178 | 110–125 |
| | Chimassorb 944LD[c)] | 0.20 | >2500 | 120–150 |
| Example 2c | Irgafos 168[a)] | 0.10 | 647 | 180–185 |
| | Irganox 1010[b)] | 0.05 | 1178 | 110–125 |
| | Chimassorb 119FL/10[d)] | 0.20 | 2286 | 115–150 |

[a)]Irgafos ® 168 (Ciba-Geigy) is tris(2,4-di-tert-butylphenyl) phosphite.
[b)]Irganox ® 1010 (Ciba-Geigy) is the pentaerythritol ester of 3-(3,5-di-tert-butyl-4-hydroxyphenylpropionic acid.
[c)]Chimassorb ® 944LD (Ciba-Geigy) denotes the linear or cyclic condensation products prepared from N,N'-bis(2,2,6,6-tetramethyl-4-piperidyl) hexamethylenediamine and 4-tert-octylamino-2,6-dichloro-1,3,5-triazine.
[d)]Chimassorb ® 119FL/10 (Ciba-Geigy) denotes a condensation product prepared from 2-chloro-4,6-di(4-n-butylamino-1,2,2,6,6-pentamethylpiperidyl)-1,3,5-triazine and 1,2-bis(3-aminopropylamino) ethane.

The stabilized polyethylene test sheets are subjected, analogously to Example 1, to the water extraction conditions described in Example 1 at 95° C. for up to 16,030 hours (668 days). When the extraction experiments are complete, the tear strength in megapascals (MPa) of the test sheets is determined. The tear strength is measured in accordance with DIN 53504 using an S2 standard rod. The tensile tests are carried out at room temperature at the earliest 24 hours after the respective sample has been removed form the water bath. The take-off rate is 200 mm/minute. The higher the tear strength value, the better the polyolefins are stabilized and the more stable the polyolefins are to extracting water which is in permanent contact with the polyolefins. The results are summarized in Table 7.

TABLE 7

Extraction experiments with water at 95° C.

| Extraction duration | Tear strength in MPa | | |
|---|---|---|---|
| (hours) | Example 2a | Example 2b | Example 2c |
| 0 | 36.3 | 38.8 | 35.5 |
| 2034 | 24.6 | 37.1 | 33.0 |
| 5708 | 20.3 | 35.2 | 30.2 |
| 7487 | 18.6 | 30.7 | 28.4 |
| 16030 | 16.9 | 27.7 | 19.9 |

EXAMPLE 3

Stability of polyethylene which is in permanent contact with water and which has been stabilized by means of a component (b) and a component (c)(iii).

The stabilizers shown in Table 8 are incorporated into the medium-density polyethylene analogously to Example 1.

TABLE 8

| Example | Stabilizer | Amount (% by wt.) | Molar mass (g/mol) | m.p. (° C.) |
|---|---|---|---|---|
| Example 3a | Irgafos 168[a] | 0.10 | 647 | 180–185 |
| | Irganox 1010[b] | 0.10 | 1178 | 110–125 |
| Example 3b | Irgafos 168[a] | 0.10 | 647 | 180–185 |
| | Irganox 1010[b] | 0.05 | 1178 | 110–125 |
| | Tinuvin 622[c] | 0.20 | >2500 | 55–70 |
| Example 3c | Irgafos 168[a] | 0.10 | 647 | 180–185 |
| | Irganox 1010[b] | 0.05 | 1178 | 110–125 |
| | Cyasorb 3346[d] | 0.20 | 1500–1800 | 110–130 |
| Example 3d | Irgafos 168[a] | 0.10 | 647 | 180–185 |
| | Irganox 1010[b] | 0.05 | 1178 | 110–125 |
| | Hostavin N30[e] | 0.20 | >1500 | 100–130 |
| Example 3e | Irgafos 168[a] | 0.10 | 647 | 180–185 |
| | Irganox 1010[b] | 0.05 | 1178 | 110–125 |
| | Uvasorb HA 88[f] | 0.20 | 3300 | 120–150 |
| Example 3f | Irgafos 168[a] | 0.10 | 647 | 180–185 |
| | Irganox 1010[b] | 0.05 | 1178 | 110–125 |
| | Dastib 1082[g] | 0.20 | 2970 | 162–181 |
| Example 3g | Irgafos 168[a] | 0.10 | 647 | 180–185 |
| | Irganox 1010[b] | 0.05 | 1178 | 110–125 |
| | Uvinul 5050[h] | 0.20 | 3500 | 95–125 |
| Example 3h | Irgafos 168[a] | 0.10 | 647 | 180–185 |
| | Irganox 1010[b] | 0.05 | 1178 | 110–125 |
| | MARK LA 63[i] | 0.20 | 2000 | 80–90 |
| Example 3i | Irgafos 168[a] | 0.10 | 647 | 180–185 |
| | Irganox 1010[b] | 0.05 | 1178 | 110–125 |
| | MARK LA 68[j] | 0.20 | 1900 | 70–80 |
| Example 3j | Irgafos 168[a] | 0.10 | 647 | 180–185 |
| | Irganox 1010[b] | 0.05 | 1178 | 110–125 |
| | Uvasil 299[k] | 0.20 | 1100–2500 | |
| Example 3k | Irgafos 168[a] | 0.10 | 647 | 180–185 |
| | Irganox 1010[b] | 0.05 | 1178 | 110–125 |
| | Lichtschutzstoff UV-31[l] | 0.20 | 2580 | 100–125 |
| Example 3l | Irgafos 168[a] | 0.10 | 647 | 180–185 |
| | Irganox 1010[b] | 0.05 | 1178 | 110–125 |
| | Chimassorb 944[m] | 0.20 | 2580 | 100–125 |
| Example 3m | Irgafos 168[a] | 0.10 | 647 | 180–185 |
| | Irganox 1010[b] | 0.05 | 1178 | 110–125 |
| | Chimassorb 119 FL/10[n] | 0.20 | 2580 | 100–125 |

[a] Irgafos ® 168 (Ciba-Geigy) is tris(2,4-di-tert-butylphenyl)phosphite.
[b] Irganox ® 1010 (Ciba-Geigy) is the pentaerythrol ester of 3-(3,5-di-tert-butyl-4-hydroxyphenylpropionic acid.
[c] Tinuvin ® 622 (Ciba-Geigy) is poly-(N-β-hydroxyethyl-2,2,6,6-tetramethyl-4-hydroxy-piperidyl succinate).
[d] Cyasorb ® UV 3346 (Cytec) is a compound of the formula 92.

(92)

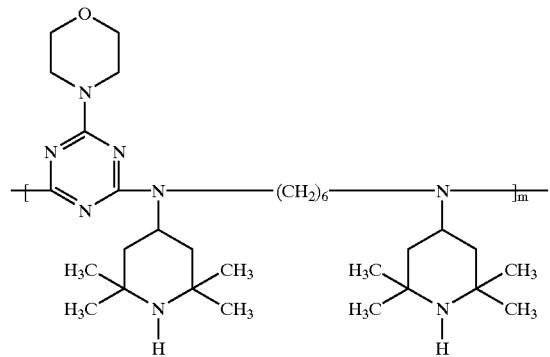

[e] Hostavin ® N30 (Hoechst) is a reaction product of the compound the formula

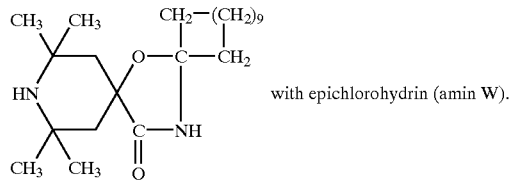

with epichlorohydrin (amin W).

TABLE 8-continued
f) Uvasorb ® HA 88 (Sigma) is a compound of the formula 95.
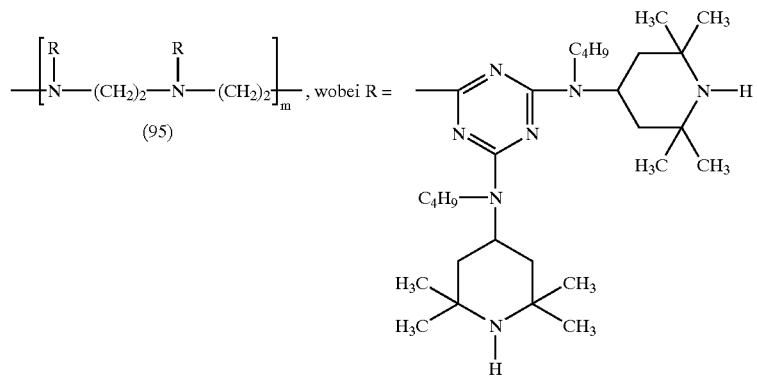
g) Dastib ® 1082 (Slovakia) is a compound of the formula 92'.
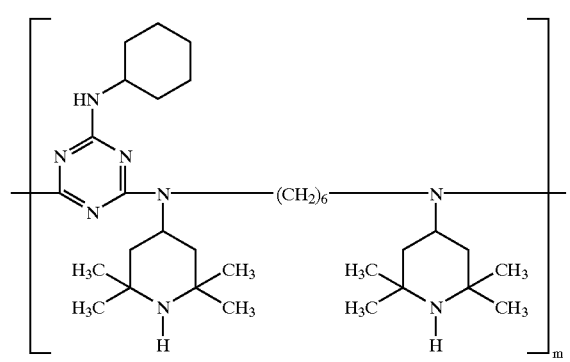
h) Uvinul ® 5050 (BASF) is a compound of the formula A'.
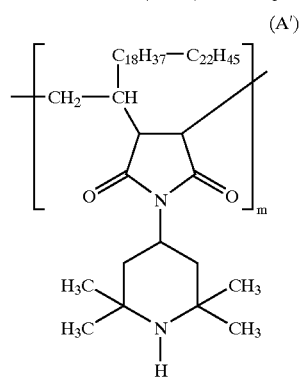
i) MARK ® LA 63 (Asahi Denka) is a compound of the formula B'.
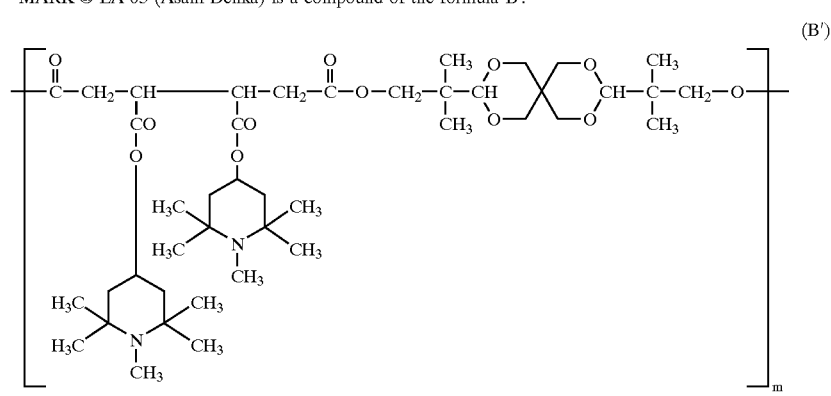

TABLE 8-continued j) MARK ® LA 68 (Asahi Denka) is a compound of the formula C'.

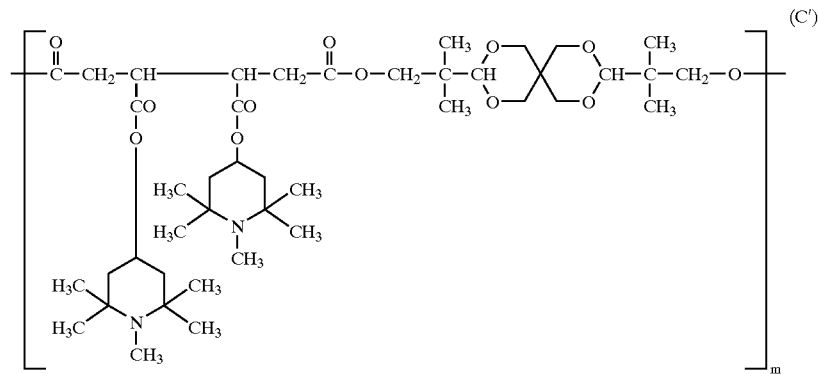

k) Uvasil ® 299 (Great Lakes Chemicals) is a compound of the formula D'.

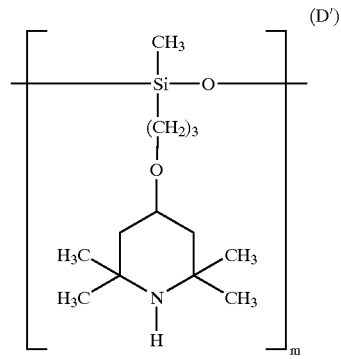

l) Lichtschutzstoff UV-31 (Leuna) is a compound of the formula E'

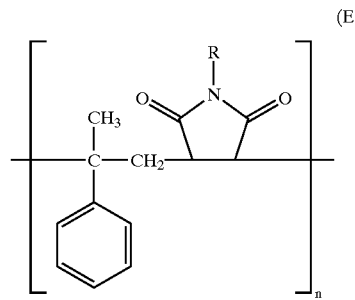

in which R is octadecyl or 2,2,6,6-tetramethyl-4-piperidyl.

m) Chimassorb ® 944LD (Ciba-Geigy) denotes the linear or cyclic condensation products prepared from N,N'-bis(2,2,6,6-tetramethyl-4-piperidyl)hexamethylenediamine and 4-tert-octylamino-2,6-dichloro-1,3,5-triazine.

n) Chimassorb ® 119 FL/10 (Ciba-Geigy) denotes a condensation product prepared from 2-chloro-4,6-di(4-n-butylamino-1,2,2,6,6-pentamethylpiperidyl)-1,3,5-triazine and 1,2-bis(3-aminopropylamino)ethane.

The stabilized polyethylene test sheets are subjected, analogously to Example 1, to the water extraction conditions described in Example 1 at 95° C. for up to 16,030 hours (668 days). When the extraction experiments are complete, the tear strength of the test sheets is determined in percent. The tear strength is measured in accordance with DIN 53504 using an S2 standard rod. The tensile tests are carried out at room temperature at the earliest 24 hours after the respective sample has been removed form the water bath. The take-off rate is 200 mm/minute. The higher the tear strength value, the better the polyolefins are stabilized and the more stable the polyolefins are to extracting water which is in permanent contact with the polyolefins. The results are summarized in Table 9.

TABLE 9

Extraction eperiments with water at 95° C.

Tear strength in percent after x hours of extraction

| Examples | 0 hour | 2034 hours | 5708 hours | 7487 hours | 16030 hours |
| --- | --- | --- | --- | --- | --- |
| Example 3a | 840 | 651 | 592 | 598 | 581 |
| Example 3b | 845 | 675 | 642 | 601 | 601 |
| Example 3c | 841 | 762 | 678 | 685 | 620 |
| Example 3d | 835 | 775 | 766 | 671 | 615 |
| Example 3e | 836 | 681 | 634 | 645 | 617 |
| Example 3f | 840 | 721 | 635 | 631 | 618 |
| Example 3g | 842 | 702 | 688 | 679 | 619 |
| Example 3h | 839 | 684 | 627 | 623 | 621 |

TABLE 9-continued

Extraction eperiments with water at 95° C.

Tear strength in percent after x hours of extraction

| Examples | 0 hour | 2034 hours | 5708 hours | 7487 hours | 16030 hours |
|---|---|---|---|---|---|
| Example 3i | 838 | 681 | 679 | 595 | 619 |
| Example 3j | 846 | 709 | 635 | 625 | 624 |
| Example 3k | 850 | 711 | 630 | 576 | 622 |
| Example 3l | 851 | 842 | 805 | 801 | 723 |
| Example 3m | 849 | 815 | 733 | 702 | 675 |

EXAMPLE 4

Stability of polyethylene which is in permanent contact with water and which has been stabilized by means of a component (b) and a component (c)(iii).

The stabilizers shown in Table 10 are incorporated into the medium-density polyethylene analogously to Example 1.

TABLE 10

| Example | Stabilizer | Amount (% by wt.) | Molar mass (g/mol) | m.p. (° C.) |
|---|---|---|---|---|
| Example 4a | Irgafos 168[a] | 0.10 | 647 | 180–185 |
|  | Irganox 1010[b] | 0.10 | 1178 | 110–125 |
| Example 4b | Irgafos 168[a] | 0.10 | 647 | 180–185 |
|  | Irganox 1010[b] | 0.05 | 1178 | 110–125 |
|  | Chimassorb 944[c] | 0.20 | 2580 | 100–125 |
| Example 4c | Irgafos 168[a] | 0.10 | 647 | 180–185 |
|  | Irganox 1010[b] | 0.05 | 1178 | 110–125 |
|  | Cyasorb 3346[d] | 0.20 | 1500–1800 | 110–130 |
| Example 4d | Irgafos 168[a] | 0.10 | 647 | 180–185 |
|  | Irganox 1010[b] | 0.05 | 1178 | 110–125 |
|  | Uvasorb HA 88[e] | 0.20 | 3300 | 120–150 |
| Example 4e | Irgafos 168[a] | 0.10 | 647 | 180–185 |
|  | Irganox 1010[b] | 0.05 | 1178 | 110–125 |
|  | Hostavin N30[f] | 0.20 | >1500 | 100–130 |
| Example 4f | Irgafos 168[a] | 0.10 | 647 | 180–185 |
|  | Irganox 1010[b] | 0.05 | 1178 | 110–125 |
|  | Uvinul 5050[g] | 0.20 | 3500 | 95–125 |
| Example 4g | Irgafos 168[a] | 0.10 | 647 | 180–185 |
|  | Irganox 1010[b] | 0.05 | 1178 | 110–125 |
|  | Chimassorb 119 FL/10[h] | 0.20 | 2580 | 100–125 |

[a] Irgafos ® 168 (Ciba-Geigy) is tris(2,4-di-tert-butylphenyl)phosphit.
[b] Irganox ® 1010 (Ciba-Geigy) is the pentaerythritol ester of 3-(3,5-Di-tert-butyl-4-hydroxyphenylpropionic acid.
[c] Chimassorb ® 944 (Ciba-Geigy) denotes the linear or cyclic condenstaion products prepared from N,N'-bis(2,2,6,6-tetramethyl-4-piperidyl) hexamethylenediamine and 4-tert-octylamino-2,6-dichloro-1,3,5-triazine.
[d] Cyasorb ® UV 3346 (Cytec) is a compound of the formula 92.

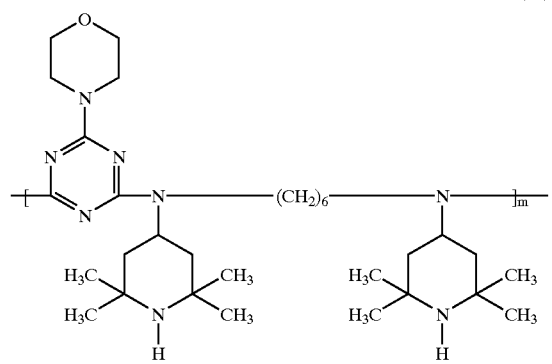

(92)

[e] Hostavin ® N30 (Hoechst) is a reaction product of the compound the formula with epichlorohydrin (amin W).

[f] Uvasorb ® HA 88 (Sigma) is a compound of the formula 95

(95)

[g] Uvinul ® 5050 (BASF) is a compound of the formula A'.

, in which R is (A')

[h] Chimassorb ® 119 FL/10 (Ciba-Geigy) denotes a condensation product prepared from 2-chloro-4,6-di(4-n-butylamino-1,2,2,6,6-pentamethylpiperidyl)-1,3,5-triazine and 1,2-bis(3-aminopropylamino) ethane.

The polyethylene was extruded by an extruder of the Maillefer type to form pipes with an outside diameter of 20 mm and a wall-thickness of 2 mm. The machine parameters for the preparation of the pipes are summarized in Table 11.

TABLE 11

Machine parameters for the prapartion of pipes

| Cylinder temperature | 185, 195, 210 und 220° C. |
|---|---|
| Nozzle temperature | 220, 200 und 190° C. |
| Screw configuration | L/d = 25, d = 60 mm |
| Screw speed | 56 rpm |
| Cooling agent | Water |
| Take-off speed | 6 m/minute |

The stability of the polyethylene pipes are measured at 105° C. (inside of the pipe is water, outside of the pipe is air)

and a hoop stress of 1.5 MPa in the inside compressive creep test according to DIN 53759. Under this low hoop stress a polyethylene pipe is decomposed by thermal-oxidative degradation. The higher the retention time value, the better the polyolefins are stabilized and the more stable the polyolefins are to extracting water which is in permanent contact with the polyolefins. The results are summarized in Table 12.

TABLE 12

Stability of pipes (inside water, outside air)

| Examples | Retention time in hours at a hoop stress of 1,5 MPa |
|---|---|
| Example 4a | 10005 |
| Example 4b | 13245 |
| Example 4c | 11968 |
| Example 4d | 11902 |
| Example 4e | 11858 |
| Example 4f | 12012 |
| Example 4g | 15521 |

EXAMPLE 5

Stability of polyethylene which is in permanent contact with water and which has been stabilized by means of a component (b) and a component (c)(iii).

The stabilizers shown in Table 13 are incorporated into the medium-density polyethylene (PE-LLD, MFI at 230° C./2.16 kg=1.0 g/10 minutes, density=0.937 g/cm$^3$) analogously to Example 1.

TABLE 13

| Example | Stabilizer | Amount (% by wt.) | Molar mass (g/mol) | m.p. (° C.) |
|---|---|---|---|---|
| Example 5a | Irgafos 168[a] | 0.10 | 647 | 180–185 |
| | Irganox MD1024[b] | 0.07 | 553 | 224–229 |
| | Irganox 1330[a] | 0.20 | 775 | 241–245 |
| Example 5b | Irgafos 168[a] | 0.10 | 647 | 180–185 |
| | Irganox MD1024[b] | 0.07 | 553 | 224–229 |
| | Irganox 1330[a] | 0.10 | 775 | 241–245 |
| | Chimassorb 944[a] | 0.10 | 2580 | 100–125 |
| Example 5c | Irgafos 168[a] | 0.10 | 647 | 180–185 |
| | Irganox MD 1024[b] | 0.07 | 553 | 224–229 |
| | Irganox 1330[a] | 0.10 | 775 | 241–245 |
| | Chimassorb 119 FL/10[a] | 0.10 | 2580 | 100–125 |

[a]The chemical structures of Irgafos ® 168, Irganox ® 1330, Chimassorb ® 944 and Chimassorb ® 119 FL/10 are disclosed in the Examples 1, 2, 3, or 4.
[b]Irganox ® MD 1024 (Ciba-Geigy) is a compound of the formula

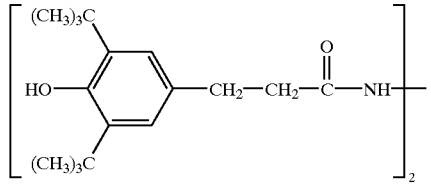

(Irganox®MD 1024)

The stabilized polyethylene test sheets are subjected, analogously to Example 1, to the water extraction conditions described in Example 1 at 90° C. for up to 12 months. When the extraction experiments are complete, the sheets are subjected to an oven aging in a circulating air oven at 110° C. The time until the polyolefins are embrittled is measured. The higher time until the polyolefins are embrittled, the better the polyolefins are stabilized and the more stable the polyolefins are to extracting water which is in permanent contact with the polyolefins. The results are summarized in Table 14.

TABLE 14

Oven ageing

| Examples | Time until embrittlement in days |
|---|---|
| Example 5a | 10 |
| Example 5b | 1071 |
| Example 5c | 1255 |

EXAMPLE 6

Stability of polypropylene which is in permanent contact with water and which has been stabilized by means of a component (b) and a component (c)(iii).

The stabilizers shown in Table 15 are incorporated into the polypropylene rPP (statistical polypropylene copolymer, MFI at 230° C./2.16 kg=0.8 g/10 minutes, density=0.910 g/cm$^3$) analogously to Example 1.

TABLE 15

| Example | Stabilizer | Amount (% by wt.) | Molar mass (g/mol) | m.p. (° C.) |
|---|---|---|---|---|
| Example 6a | Irgafos 168[a] | 0.10 | 647 | 180–185 |
| | Irganox 1076[b] | 0.05 | 531 | 50–55 |
| Example 6b | Irgafos 168[a] | 0.10 | 647 | 180–185 |
| | Irganox 1076[b] | 0.05 | 531 | 50–55 |
| | Chimassorb 944[a] | 0.10 | 2580 | 100–125 |
| Example 6c | Irgafos 168[a] | 0.10 | 647 | 180–185 |
| | Irganox 1076[b] | 0.05 | 531 | 50–55 |
| | Cyasorb 3346[a] | 0.10 | 1500–1800 | 110–130 |
| Example 6d | Irgafos PEPQ[c] | 0.10 | 991 | 85–110 |
| | Irganox 1076[b] | 0.05 | 531 | 50–55 |
| | Chimassorb 944[a] | 0.10 | 2580 | 100–125 |
| Example 6e | Irgafos PEPQ[c] | 0.10 | 991 | 85–110 |
| | Irganox 1076[b] | 0.05 | 531 | 50–55 |
| | Cyasorb 3346[a] | 0.10 | 1500–1800 | 110–130 |
| Example 6f | Irgafos 38[d] | 0.10 | 514 | 89–92 |
| | Irganox 1076[b] | 0.05 | 531 | 50–55 |
| | Chimassorb 944[a] | 0.10 | 2580 | 100–125 |
| Example 6g | Irgafos 38[d] | 0.10 | 514 | 89–92 |
| | Irganox 1076[b] | 0.05 | 531 | 50–55 |
| | Cyasorb 3346[a] | 0.10 | 1500–1800 | 110–130 |
| Example 6h | Irgafos 12[e] | 0.10 | 1465 | 205 |
| | Irganox 1076[b] | 0.05 | 531 | 50–55 |
| | Chimassorb 944[a] | 0.10 | 2580 | 100–125 |
| Example 6i | Irgafos 12[e] | 0.10 | 1465 | 205 |
| | Irganox 1076[b] | 0.05 | 531 | 50–55 |
| | Cyasorb 3346[a] | 0.10 | 1500–1800 | 110–130 |

[a]The chemical structures of Irgafos ® 168, Chimassorb ® 944 and Cyasorb ® 3346 are disclosed in the Examples 1, 2, 3, 4 or 5.
[b]Irganox ® 1076 (Ciba-Geigy) is a compound of the formula

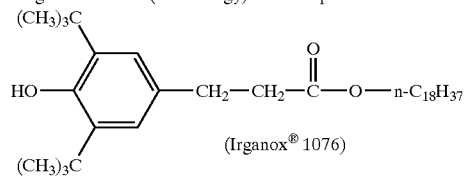

(Irganox® 1076)

TABLE 15-continued

| Example | Stabilizer | Amount (% by wt.) | Molar mass (g/mol) | m.p. (° C.) |
|---|---|---|---|---| c) Irgafos ® PEPQ (Ciba-Geigy) is a compound of the formula Ph-3.

(Ph-3)

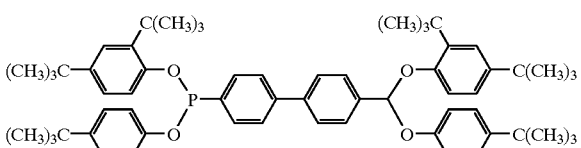

d) Irgafos ® 38 (Ciba-Geigy) is a compound of the formula Ph-1.

(Ph-1)

e) Irgafos ® 12 (Ciba-Geigy) is a compound of the formula Ph-11.

(Ph-11)

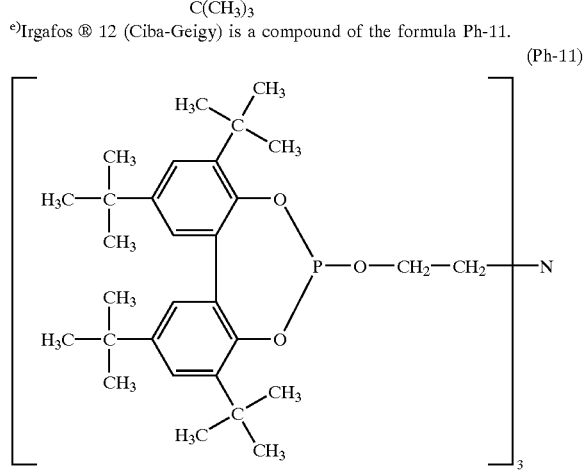

The stabilized polypropylene test sheets are subjected, analogously to Example 1, to the water extraction conditions described in Example 1 at 98° C. for up to 6 months. When the extraction experiments are complete, the sheets are subjected to an oven aging in a circulating air oven at 135° C. The time until the polyolefins are embrittled is measured. The higher time until the polyolefins are embrittled, the better the polyolefins are stabilized and the more stable the polyolefins are to extracting water which is in permanent contact with the polyolefins. The results are summarized in Table 16.

TABLE 16

| | Oven ageing |
|---|---|
| Examples | Time until embrittlement in days |
| Example 6a | 5 |
| Example 6b | 33 |
| Example 6c | 36 |
| Example 6d | 32 |
| Example 6e | 36 |
| Example 6f | 38 |

TABLE 16-continued

| | Oven ageing |
|---|---|
| Examples | Time until embrittlement in days |
| Example 6g | 42 |
| Example 6h | 35 |
| Example 6i | 34 |

EXAMPLE 7

Stability of polypropylene which is in permanent contact with water and which has been stabilized by means of a component (b) and a component (c)(iii).

The stabilizers shown in Table 17 are incorporated into the polypropylene (MFI at 230° C./2.16 kg=2.0 g/10 minutes, density=0.905 g/cm$^3$) analogously to Example 1.

TABLE 17

| Examples | Stabilizer | Amount (% by wt.) | Molar mass (g/mol) | m.p. (° C.) |
|---|---|---|---|---|
| Example 7a | Irgafos 168[a] | 0.10 | 647 | 180–185 |
| | Irganox 1010[a] | 0.35 | 1178 | 110–125 |
| Example 7b | Irgafos 168[a] | 0.10 | 647 | 180–185 |
| | Irganox 1010[a] | 0.05 | 1178 | 110–125 |
| | Chimassorb 119 FL/10[a] | 0.35 | 2580 | 100–125 |

[a] The chemical structures of Irgafos ® 168, Irganox ® 1010 and Chimassorb ® 119 FL/10 are disclosed in the Examples, 1, 2, 3, 4, 5 or 6.

The stabilized polypropylene test sheets are subjected, analogously to Example 1, to the water extraction conditions described in Example 1 at 98° C. for up to 6 months. When the extraction experiments are complete, the sheets are subjected to an oven aging in a circulating air oven at 120° C. The time until the polyolefins are embrittled is measured. The higher time until the polyolefins are embrittled, the better the polyolefins are stabilized and the more stable the polyolefins are to extracting water which is in permanent contact with the polyolefins. The results are summarized in Table 18.

TABLE 18

| | Oven ageing |
|---|---|
| Examples | Time until embrittlement in days |
| Example 7a | 215 |
| Example 7b | 504 |

What is claimed is:

1. A process for stabilizing and using a thick-walled polyolefin molding, which comprises incorporating into, or applying to said thick-walled polyolefin molding, a mixture of from about 0.02 to about 0.6%, based on weight of polyolefin, of component (b); from about 0.02 to about 0.5%, based on weight of polyolefin, of component (c); and from about 0.02% to about 1.0%, based on weight of polyolefin, of component (d), wherein: component (b) is selected from the group consisting of tris(2,4-di-tert-butylphenyl) phosphite and compounds of formulas Ph-3 and Ph-11;

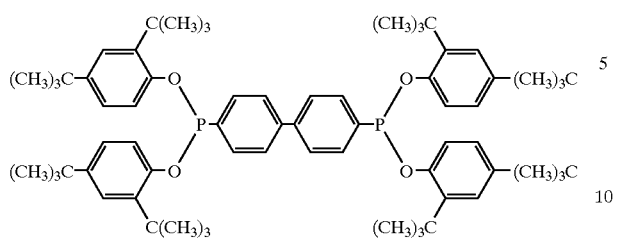
(Ph-3)

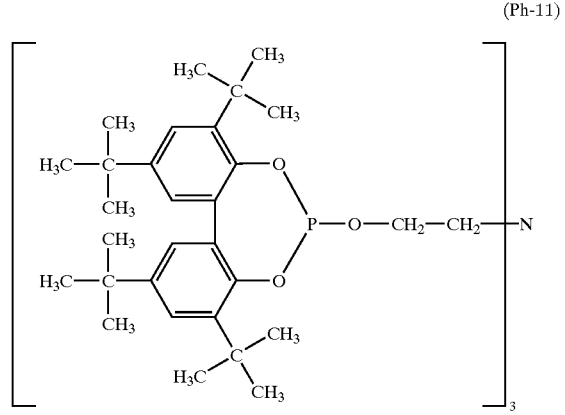
(Ph-11)

component (c) is a compound of formula I

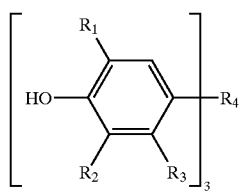
(I)

in which
R$_1$ and R$_2$ is tert-butyl,
R$_3$ is hydrogen, and

R$_4$ is 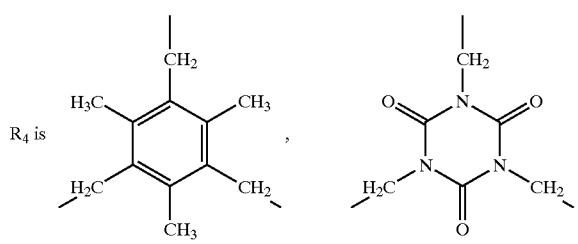, or in which component (c) is

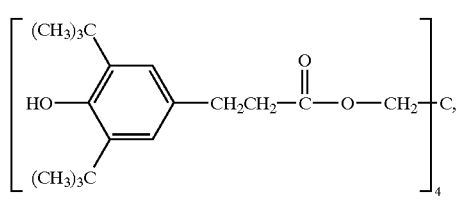

-continued

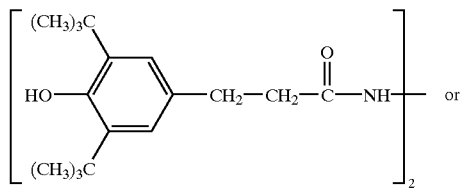 or

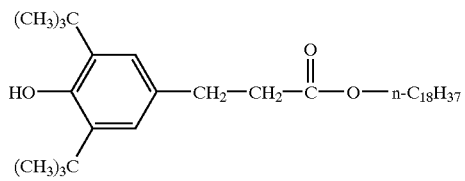

and component (d) is a compound, selected from the group consisting of sterically hindered amines having a molecular weight greater than 1000 and which contain at least one radical of the formula VI or VI'

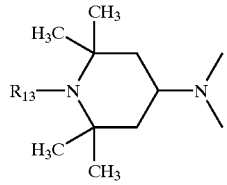
(VI)

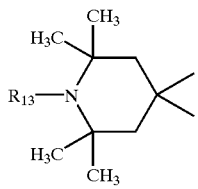
(VI')

wherein

R$_{13}$ is hydrogen or methyl; and placing said stabilized thick-walled polyolefin molding in permanent contact with water.

2. A process according to claim 1, in which the polyolefin moulding has a wall thickness of from 1 to 50 mm.

3. A process according to claim 1, in which the polyolefin moulding is a pipe or geomembrane.

4. A process according to claim 1 comprising further additives in addition to components (b), (c) and (d).

5. A process according to claim 1 wherein the polyolefin molding component (a) is polyethylene or polypropylene or a copolymer thereof which a monoolefin or diolefin.

* * * * *

UNITED STATES PATENT AND TRADEMARK OFFICE
CERTIFICATE OF CORRECTION

PATENT NO. : 6,541,547 B1
DATED : April 1, 2003
INVENTOR(S) : Thomas Schmutz et al.

It is certified that error appears in the above-identified patent and that said Letters Patent is hereby corrected as shown below:

<u>Title page,</u>
Item [30] was omitted, and should therefore be inserted after Item [22]:

-- [30] Foreign Application Priority Data

Sept. 15, 1995    (CH)    2616/95 --.

Signed and Sealed this

Ninth Day of September, 2003

JAMES E. ROGAN
*Director of the United States Patent and Trademark Office*